US006898759B1

(12) United States Patent
Terada et al.

(10) Patent No.: US 6,898,759 B1
(45) Date of Patent: May 24, 2005

(54) SYSTEM OF GENERATING MOTION PICTURE RESPONSIVE TO MUSIC

(75) Inventors: Kosei Terada, Hamamatsu (JP); Akitoshi Nakamura, Hamamatsu (JP); Hiroaki Takahashi, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 09/197,184

(22) Filed: Nov. 20, 1998

(30) Foreign Application Priority Data

Dec. 2, 1997 (JP) .......................................... 9-347016
Jan. 13, 1998 (JP) .......................................... 10-018258

(51) Int. Cl.[7] .......................................... G06F 15/00

(52) U.S. Cl. .................... 715/500.1; 345/473; 345/706

(58) Field of Search ...................... 715/500.1; 345/473, 345/474, 706, 716; 707/500.1

(56) References Cited

U.S. PATENT DOCUMENTS

| | | | | |
|---|---|---|---|---|
| 3,572,915 A | * 3/1971 | Butterfield | ..................... | 352/1 |
| 4,658,427 A | * 4/1987 | Aubin | ........................ | 381/124 |
| 4,884,972 A | * 12/1989 | Gasper | .................... | 707/500.1 |
| 5,359,341 A | * 10/1994 | Hutchings | .................... | 345/45 |
| 5,577,185 A | * 11/1996 | Tunnell et al. | .............. | 345/473 |

(Continued)

FOREIGN PATENT DOCUMENTS

| | | |
|---|---|---|
| EP | 0420657 A2 * | 3/1991 |
| EP | 0849950 A2 * | 6/1998 |
| JP | Hei-3-216767 | 9/1991 |
| JP | 08-030807 | 2/1996 |
| JP | Hei-8-293039 | 11/1996 |
| JP | 09-261604 | 10/1997 |
| JP | 10-164142 | 6/1998 |
| JP | 10-164512 | 6/1998 |
| JP | 11-004204 | 1/1999 |
| JP | 11-095778 | 4/1999 |

OTHER PUBLICATIONS

The background story of Animusic at http://www.thescreamonline.com/music/music3–2/animusic/animusic.html, May 29, 2003, pp. 1–2.*

Figueiredo, Animusic, Google Aug. 5, 2002, pp. 1–3.*

Folkart, Rudolf Ising Founded Cartoon Studios, Log Angeles Times, Jul. 22, 1992, p. 12.*

Buxton, Art or Virtual Cinema, Computer Graphics, Feb. 1997, pp. 1–2.*

Mackay et al., Video Mosaic : Laying Out Time in a Physical Space, ACM 1994, pp. 165–172.*

Modler et al., Gesture Recognition by Neural Networks and the Expression of Emotions, IEEE, 10/98, pp. 1072–1075.*

Tadamura et al., Synchronizing Computer Graphics Animation and Audio, IEEE, 12/98, pp. 63–73.*

Lewis et al., Automated Lip–Synch and Speech Synthesis for Character Animation, ACM 1987, pp. 143–147.*

(Continued)

*Primary Examiner*—Stephen S. Hong
*Assistant Examiner*—Cong-Lac Huynh
(74) *Attorney, Agent, or Firm*—Morrison & Foerster LLP

(57) ABSTRACT

In a system for animating an object along a music, a sequencer module sequentially provides music control information and a synchronization signal in correspondence with the music to be played. A parameter setting module is operable to set motion parameters effective to determine movements of movable parts of the object. An audio module is responsive to the synchronization signal for generating a sound in accordance with the music control information to thereby play the music. A video module is responsive to the synchronization signal for generating a motion image of the object in matching with progression of the music. The video module utilizes the motion parameters to basically control the motion image, and utilizes the music control information to further control the motion image in association with the played music.

22 Claims, 25 Drawing Sheets

U.S. PATENT DOCUMENTS 5,613,909 A * 3/1997 Stelovsky .................... 463/1
5,640,590 A * 6/1997 Luther .................... 715/500.1
5,642,171 A * 6/1997 Baumgartner et al. ... 707/500.1
5,657,415 A * 8/1997 Yamada .................... 386/69
5,690,496 A * 11/1997 Kennedy ................ 434/307 R
5,734,737 A * 3/1998 Chang et al. ............... 382/107
5,748,761 A * 5/1998 Chang et al. ............... 382/107
5,826,102 A * 10/1998 Escobar et al. .......... 715/500.1
5,863,206 A * 1/1999 Narusawa et al. ...... 434/307 A
5,898,429 A * 4/1999 Trom et al. .............. 707/500.1
5,915,972 A * 6/1999 Tada ...................... 434/307 A
5,949,410 A * 9/1999 Fung ...................... 707/500.1
5,952,598 A * 9/1999 Goede ....................... 84/609
6,014,117 A * 1/2000 Hennessy et al. .............. 345/8
6,052,414 A * 4/2000 Lee et al. .................. 375/240
6,055,330 A * 4/2000 Eleftheriadis et al. ...... 382/154
6,072,478 A * 6/2000 Kurihara et al. ......... 707/500.1
6,087,577 A * 7/2000 Yahata et al. ................ 84/478
6,160,907 A * 12/2000 Robotham et al. .......... 345/419
6,163,323 A * 12/2000 Intriligator .................. 345/473
6,227,968 B1 * 5/2001 Suzuki et al. .................. 463/7
6,238,217 B1 * 5/2001 Mirando et al. ............ 434/365
6,245,982 B1 * 6/2001 Suzuki et al. ............. 84/477 R
6,278,466 B1 * 8/2001 Chen .......................... 345/473
6,343,987 B2 * 2/2002 Hayama et al. ................ 463/1
6,377,263 B1 * 4/2002 Falacara et al. ............ 345/473
6,433,784 B1 * 8/2002 Merrick et al. ............. 345/473

OTHER PUBLICATIONS

Tarabella et al., Devices for Interactive Computer Music and Computer Graphics Performances, Multimedia Signal Processing, 6/97, pp. 65–70.*
Title Notice of Reason for Rejection, Mailing No. 215242, Mailing Date Jul. 9, 2002 for Japanese patent application No. 018258/1998.

* cited by examiner

SYSTEM OF GENERATING MOTION PICTURE RESPONSIVE TO MUSIC

BACKGROUND OF THE INVENTION

1. Field of the Invention

The present invention relates to a technology for generating images in response to music and in particular, to a system for generating graphical moving images in response to data obtained by interpreting music.

2. Description of the Related Art

A number of technologies for changing images using computer graphics (CG) in response to music already exist in the form of software games. One example is background visuals (BGV) by which images are changed in time to music which is secondary to the primary operation of the game advancement. The BGV technology first synchronizes the music and graphics, and is not intended for fine-tuning images using music control data. In addition, among such game software, there are no titles featuring objects moving dynamically and musically, such as dancers. Some titles have psychedelic images, but because of uneasiness thereof, players are soon tired of them. Furthermore, there are now titles which generate computer graphics with flashing lights or the like in response to music data such as MIDI data.

On the other hand, there are also those technologies which, without the aid of graphics, use image patterns to display motion images corresponding to a soundtrack. For example, a music/imaging device was disclosed in Japanese Unexamined Patent No. 63-170697, which determines the mood of the music output from an electronic instrument via a musical mood sensor; reads a plurality of image patterns in regular succession via select signals corresponding to this musical mood; and displays motion images such as dancing or geometric designs, according to the musical mood. However, under these existing technologies, the necessary music data is processed into the select signals by the musical mood sensor according to the musical mood, and it therefore is not possible to obtain motion images perfectly in sync with the original music.

In addition, using image pattern data such as in the above-mentioned music/imaging device, results in little variety, despite the abundance of data. In order to obtain diverse motion images better conforming to the music, it is necessary to prepare more image pattern data. Moreover, it was extremely difficult to satisfy the diverse needs of end-users. As once the settings were in place, users could not make changes to the displayed images as they wished.

Furthermore, when generating CG motion images based on music data, because this image generation occurs as an after-effect of the musical event, there is the risk of an image-generation time lag which cannot be ignored. Also, during interpolation for smooth motion images, it is not always possible to create CG animation in sync with the music, as changes in animation speed and skips of pictures in the keyframe positions may occur depending on the computer CG drawing capacity or variables in the CPU load. Moreover, when modeling instrument players with CG motion images in music applications, it is not possible to impart natural movements corresponding to the music data to these CG motion images just by individually controlling each portion of the image according to every piece of music data.

SUMMARY OF THE INVENTION

In view of the foregoing, an object of the present invention is to provide a computer graphics motion image generation system able to move objects such as dancers and the like in sync with music such as a MIDI tune, and to generate motion go images that will change not only according to the musical mood, but also in unison with the progression of the music.

Another object of the present invention is to provide an interactive man-machine interface which not only displays motion images in perfect sync with the music, but also, based on the music data, allows the user to freely configure the movements of a moving object such as a dancer.

Still another object of the present invention is to provide a novel method of image generation capable of avoiding lags in generation of the desired image; capable of smooth interpolation processing of pictures according to the system's processing capacity; and capable of moving player models in a natural manner by interpreting the collected music data.

The inventive system is constructed for animating an object along a music. In the inventive system, a sequencer module sequentially provides music control information and a synchronization signal in correspondence with the music to be played. A parameter setting module is operable to set motion parameters effective to determine movements of movable parts of the object. An audio module is responsive to the synchronization signal for generating a sound in accordance with the music control information to thereby play the music. A video module is responsive to the synchronization signal for generating a motion image of the object in matching with progression of the music, the video module utilizing the motion parameters to basically control the motion image and utilizing the music control information to further control the motion image in association with the played music.

Preferably, the video module analyzes a data block of the music control information for preparing a frame of the motion image in advance to generation of the sound corresponding to the same data block by the audio module, so that the video module can generate the prepared frame timely when the audio module generates the sound according to the same data block used for preparation of the frame.

Preferably, the video module successively generates key frames of the motion image in response to the synchronization signal according to the motion parameters and the music control information, the video module further generating a number of sub frames inserted between the successive key frames by interpolation to smoothen the motion image while varying the number of the sub frames dependently on a resource of the system affordable to the interpolation.

Preferably, the video module generates the motion image of an object representing an instrument player, the video module sequentially analyzing the music control information to determine a rendition movement of the instrument player for controlling the motion image as if the instrument player plays the music.

Preferably, the video module generates the motion image according to the motion parameters effective to determine the movements of the movable parts of the object with respect to default positions of the movable parts, the video module periodically resetting the motion image to revert the movable parts to the default positions in matching with the progression of the music.

Preferably, the video module is responsive to the synchronization signal utilized to regulate a beat of the music so that the motion image of the object is controlled in synchronization with the beat of the music.

Preferably, the sequencer module provides the music control information containing a message specifying an instrument used to play the music, and the video module generates the motion image of an object representing a player with the specified instrument to play the music.

Preferably, the video module utilizes the motion parameters to control the motion image of the object such that the movement of each part of the object is determined by the motion parameter, and utilizes the music control information controlling an amplitude of the sound to further control the motion image such that the movement of each part determined by the motion parameter is scaled in association with the amplitude of the sound.

Preferably, the parameter setting module sets motion parameters effective to determine a posture of a dancer object, and the video module is responsive to the synchronization signal for generating the motion image of the dancer object according to the motion parameters such that the dancer object is controlled as if dancing in matching with progression of the music.

By either obtaining prior settings from the music to be played, or interpreting the music to be played, the music control data and the synchronization signal are obtained to sequentially control the movements of each portion of the image objects in the present invention. Thus, the movements of the image objects appearing onscreen are controlled by taking advantage of this information and signal in using computer graphics technology. In the present invention, it is effective to use MIDI (Musical Instrument Digital Interface) performance data as the music control data and to use dancers synchronized with this performance data for image objects to produce three-dimensional (3-D) imaging. The present invention makes it possible to generate freely moving images by interpreting the music control data included in the MIDI data. By triggering image movement through the use of pre-set events and timing, diverse movements can be generated sequentially. The present invention is equipped not only with an engine component or video module providing appropriate motion (such as dance) to image objects by interpreting music data such as MIDI data, but also with a motion parameter setting component or module which is set by the user to determine motion and sequencing. These allow visual image moving in perfect sync with the music, as the user wishes, to be generated. Interactive and karaoke-like use is thus made possible, and certain motion pictures can also be enjoyed using MIDI data. Furthermore, the present invention does not merely provide a means to enjoy musical renditions and responding visual images based on MIDI data. For example, by having the dancer object move rhythmically (dance) on the screen and by changing the motion parameter settings as desired, it is possible to add to the excitement by becoming this dancer's choreographer. This could result in the expansion of the music industry. During CG image processing of the performance data on the present invention, performance data is sequentially pre-read in advance of the music generated based on the performance data, and is performed for events to which analyzed images correspond. This facilitates the smooth drawing (image generation) during music generation, and not only tend to prevent drawing lags and overloading, but also reduces the drawing processing load, and affords image objects with more natural movement.

During CG image processing of the performance data with the present invention, a basic key frame specified by a synchronization signal corresponding to the advancement of the music is set. By using this basic key frame, the interpolation processing of the movements of each section of the image according to the processing capacity of the image generation system is made possible. The present invention thus guarantees smooth image movement and furthermore allows the creation of animation in sync with the soundtrack.

Moreover, during CG image processing of the performance data, the system of the present invention analyzes the appropriate performance format for the musician model based on the music control data. Because it is designed to control the movements of each part of the model image in accordance with the analyzed rendition format, it is possible to create animation in which the musician model moves realistically in a naturally performing manner.

DESCRIPTION OF THE PREFERRED EMBODIMENTS

Following is a detailed description of the present invention through drawings. In the present invention, any concrete or abstract object to which one wishes to provide movement in sync with music can be used as the moving image object. For example, any required number of people, animals, plants, structures, motifs, or a combination of the aforementioned objects can be used as desired.

Figure 1:
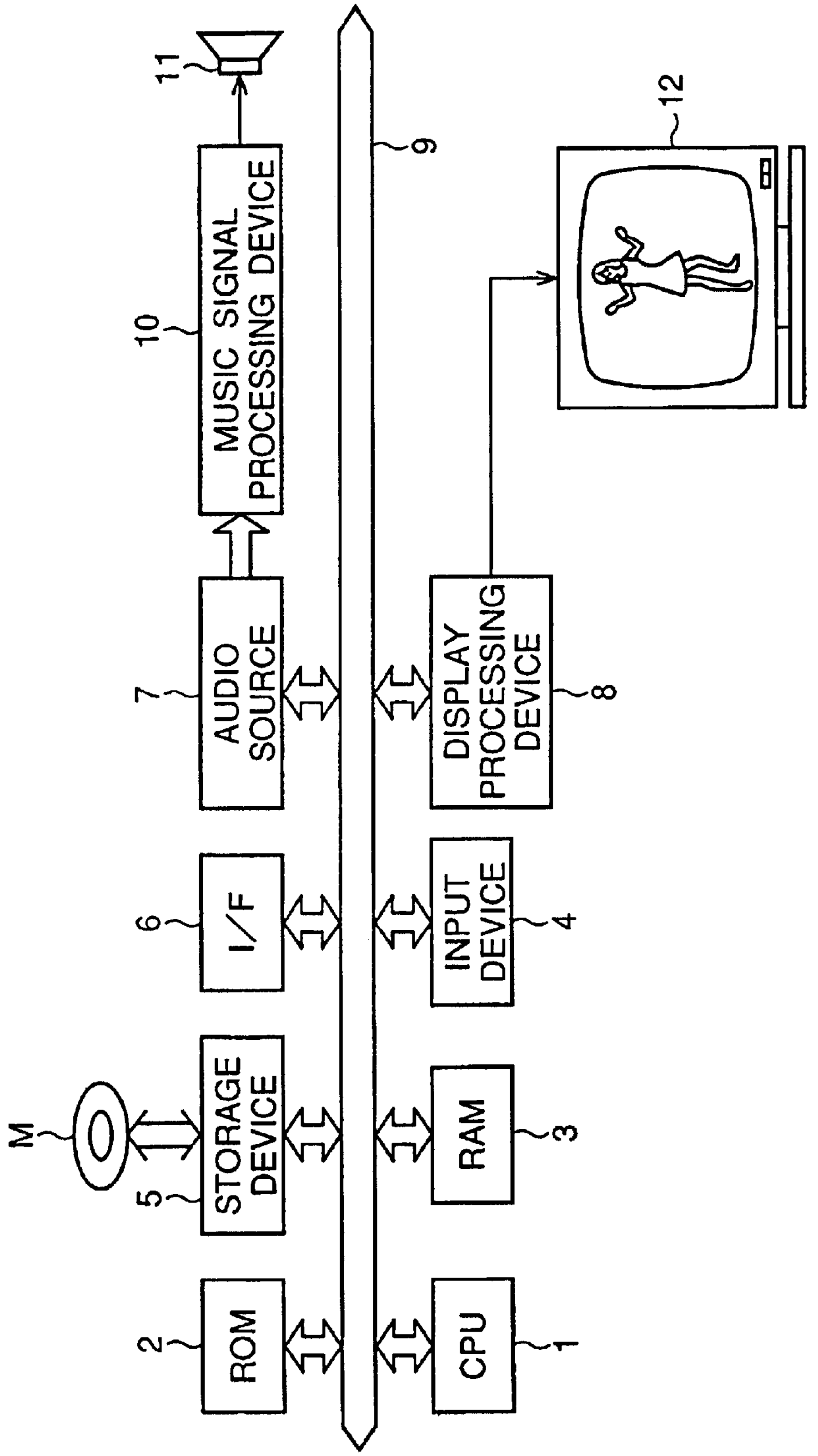
FIG. 1 is a block chart showing the hardware configuration of the music responsive image generation system of one embodiment of the present invention.

FIG. 1 shows the hardware configuration of the music responsive image generation system of the first embodiment of the present invention. This system is the equivalent of a personal computer (PC) system with an internal audio source, or a system comprising a hard drive-equipped sequencer, to which an audio source and a monitor have been added. This system is furnished with a central processing unit (CPU) 1, a read-only memory (ROM) device 2, a random-access memory (RAM) device 3, an input device 4, an external storage device 5, an input interface (I/F) 6, an audio source 7, a display processing device 8 and the like. These devices are connected to each other via a bus 9.

Specific programs for controlling the system of FIG. 1 are stored in the ROM 2. These programs include those concerning the various processes which will be explained below. The CPU 1 executes various forms of control of the entire system in accordance with the specific programs stored in the ROM 2. In particular, the CPU 1 assumes central control over the functions of sequencer and video source module, both of which will be elaborated upon later. The required data and parameters for these control processes are stored in the RAM 3. In addition, the RAM 3 can be used as a working area for the temporary storage of various registers, flags and the like.

The input device 4 is fitted with, for example, a keyboard, an operation panel equipped with various switches and the like, as well as a coordinate value input device such as a mouse. The input device 4 gives commands concerning parameter settings for each movement of a CG model, and the playing of the music and the visual display. For example, the operation panel is provided with the necessary operational devices, such as alpha-numerical keys for inputting the values of the movement parameter settings; or function keys and the like, for performing tempo increases/decreases in the range of ±5%, or for setting the point-of view (the camera position) in a 3-D visual to the front or the back, the left or the right, or returning it to its original position after rotation. Like conventional music keyboard devices such as electronic instruments and synthesizers, this input device 4 can further be equipped with a music keyboard for playing and switches. This makes it possible to provide the music data necessary for displaying images in sync with the musical performance while at the same time performing music with the music keyboards and the like.

The external storage device 5 has the function of storing and reading, as needed, music data and the various movement parameters that go with this data, as well as various CG data, background visual data and the like. Floppy disks are one example of what type of storage media can be used.

The input interface 6 is an interface designed to receive music data from external music data sources. For example, the MIDI input interface 6 receives MIDI music data from an external MIDI data source. An output interface can be added to this interface 6 in order to use the system of the present invention as the data source for a similar external system. An output interface has the function of converting everything, from music data together with its various accompanying data to specific data formats such as the MIDI format, then transmitting this to the external system.

The audio source device 7 generates digital music signals according to the music control data supplied via the bus 9, which is then supplied to the music signal processing device 10. After converting the supplied music signals to analog music signals, they are emitted from a speaker 11 by this music signal processing device 10. The aforementioned music signal processing device 10 and the speaker 11 constitute the sound system SP.

Through the bus 9, image control data is supplied to the display processing device 8. This display processing device 8 generates the necessary video signals based on this image control data, and the corresponding images are visually displayed on the display 12 by means of the video signals. The display processing device 8 and the display 12 constitute the display system DP. The display processing device 8 can be equipped with various image processing functions, such as shadowing. With regard to the development and drawing process of the image control data into images and the accompanying visual display, by separately providing a dedicated display processing device or a large monitor, motion images with more vibrancy and realism can be visualized.

Figure 2:
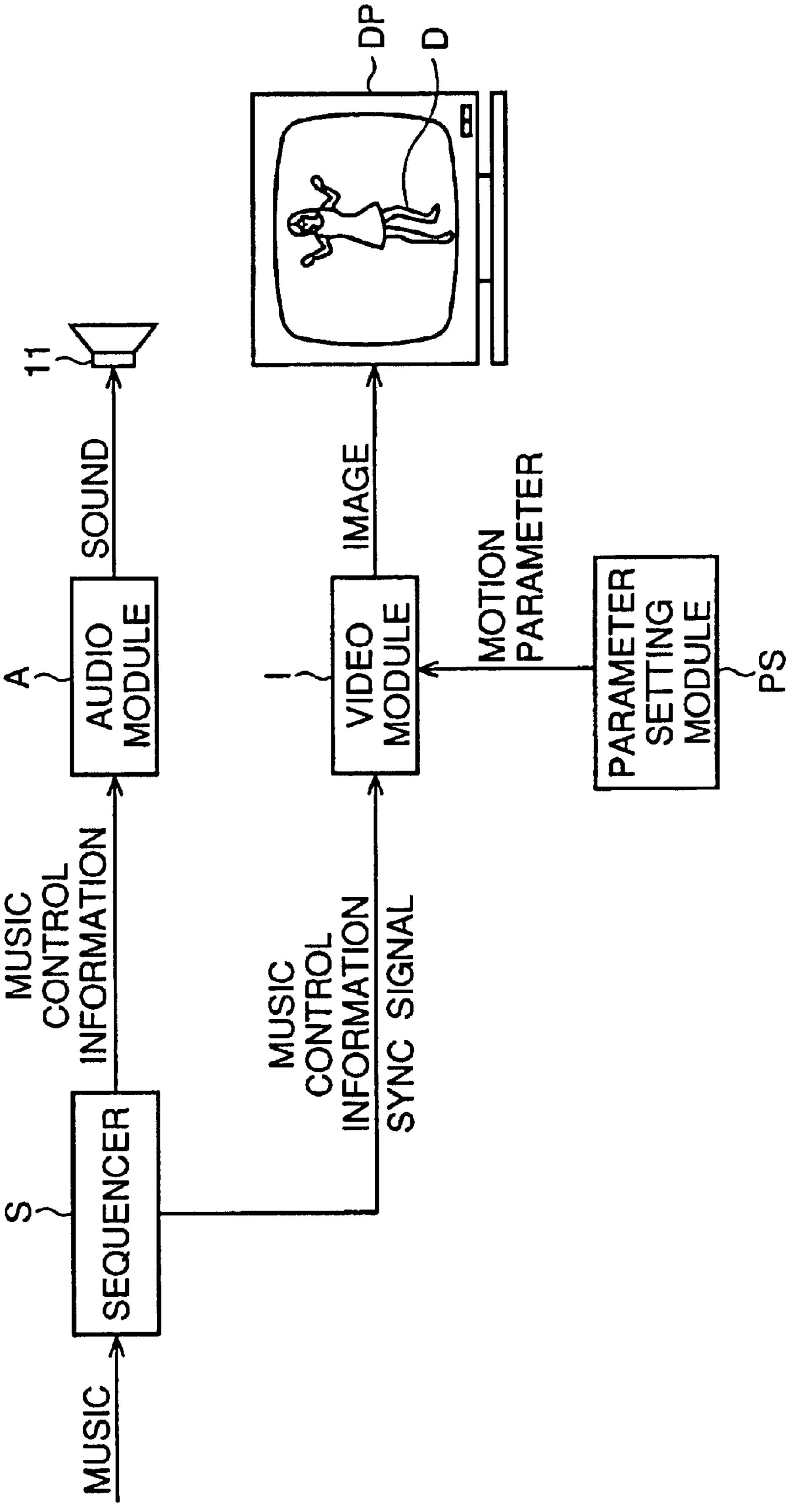
FIG. 2 is a block chart showing the software configuration of the music responsive image generation system of one embodiment of the present invention.

FIG. 2 shows the module structure of the music responsive image generating system of the first embodiment of the present invention, mainly comprising a sequencer module S, an audio source module A and a video source module I. The sequencer module S successively supplies music control data to the audio source module A, according to the music to be played, and supplies this music control data and a synchronization signal to the video source module I. To be more specific, the sequencer module S selects music data such as MIDI data, and outputs the corresponding music control data after processing, and it also outputs the synchronization signal corresponding to the music data based on the clock signal used in the selection and processing of the music data, this output being sent to the audio source module A and the video source module I. This sequencer module S is capable of using the so-called "MIDI engine", which processes the music data obtained from the MIDI data source, virtually as is. When using a music keyboard device such as an electronic musical instrument or synthesizer or the like, a data generation module which generates data and signals equivalent to the above-mentioned music control data and sync signal can be connected to these keyboard devices. Such a data generation module can be used as the sequencer module S.

The audio source module A generates music signals based on the music control data received from the sequencer module S, and produces musical sounds by means of a sound system SP. The audio source module A produces music signals based on the music control data provided from the sequencer module S, and produces music via the sound system SP. The audio source module A can use the sound sources found on conventional electronic musical instruments, automatic playing devices, synthesizers, and the like.

In image generation mode, the video source module I creates image control data based on the music control data and the sync signal received from the sequencer module S, and can display, as well as control the movements of, a 3-D image object, such as a dancer D, on the display screen of the display system DP. The video source module I is also equipped with a parameter setting sub module PS. In parameter setting mode, this sub module PS has the function of setting the movement parameters to control the movements of each section of the image object D. Thus, the video module I is able to sequentially control each section or part of the image object D by referring to the corresponding movement parameters in response to the music control data and the sync signal; and to make the image object D move in any manner corresponding to the movement parameters in sync with the progression of the music generated by audio source A.

Namely, the inventive system is constructed for animating an object along a music. In the inventive system, the sequencer module S sequentially provides music control information and a synchronization signal in correspondence with the music to be played. The parameter setting module PS is operable to set motion parameters effective to determine movements of movable parts of the object D. The audio module A is responsive to the synchronization signal for generating a sound in accordance with the music control information to thereby play the music. The video module I is responsive to the synchronization signal for generating a motion image of the object D in matching with progression of the music, the video module I utilizing the motion parameters to basically control the motion image and utilizing the music control information to further control the motion image in association with the played music.

Further, as shown in FIG. 1, a machine readable medium M can be loaded into the external storage device 5 (disk drive) for use in the inventive computer system having the CPU 1 and animating an object along a music. The medium M contains program instructions executable by the CPU 1 for causing the computer system to perform the method comprising the steps of operating the sequencer module S that sequentially provides music control information and a synchronization signal in correspondence with the music to be played, operating the parameter setting module PS to set motion parameters effective to determine movements of movable parts of the object, operating the audio module A in response to the synchronization signal for generating a sound in accordance with the music control information to thereby play the music, and operating the video module I in response to the synchronization signal for generating a motion image of the object in matching with progression of the music, the video module I utilizing the motion parameters to basically control the motion image and utilizing the music control information to further control the motion image in association with the played music.

Figure 3:
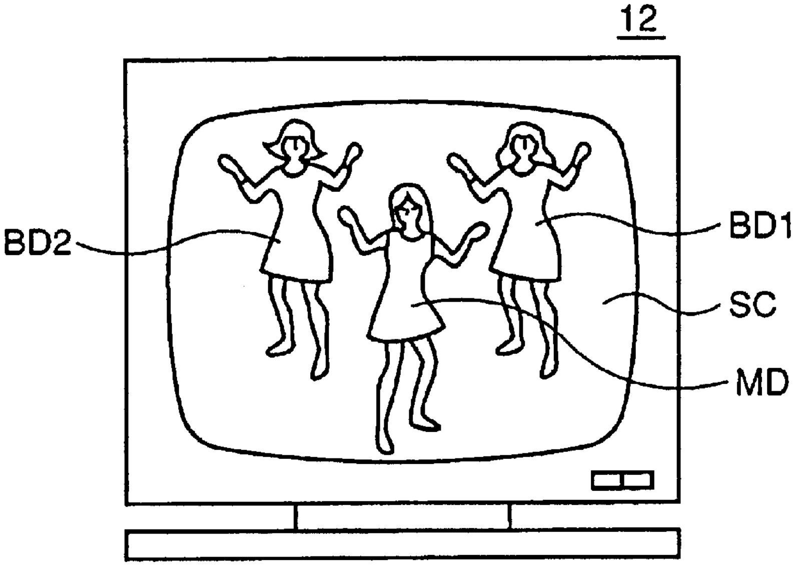
FIG. 3 shows examples of images displayed onscreen during dancing mode.

FIG. 3 shows a schematic view of examples of the images displayed on the display screen during image generation mode. In this example, the main dancer MD, and two background dancers BD1 and BD2, are used as 3-D motion image objects. Following is a more detailed description of an example in which these dancers MD, BD1, and BD2 are made to dance along the progression of the music played through the sound system, using the music control data obtained from the MIDI data.

Figure 4:
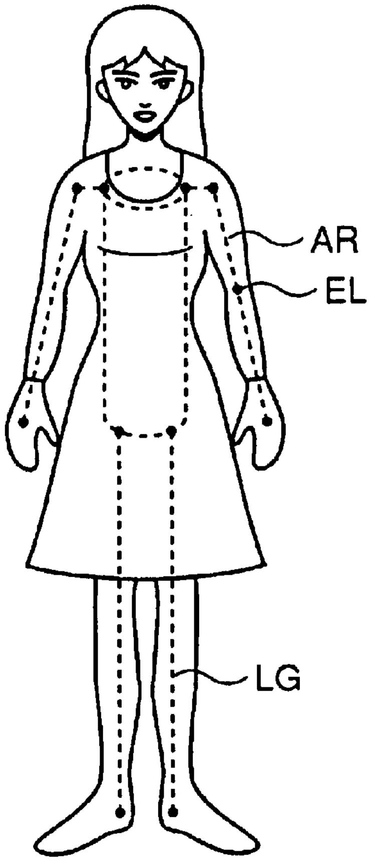
FIG. 4 is a conceptual view of the display configuration of the image object of dancers.

The video source module I is equipped with a dance module DM which executes the processes necessary for sequential movement control of each of the object dancer's movable parts in image generation mode, in sync with the music generation by the audio source module A. In order to preset these movement parameters, which determine the style of the movement of each of the dancer's movable parts, the dance module DM is also equipped with a dancer setting module as the parameter setting sub module PS. Under the parameter setting mode hereafter called as the "dancer setting mode", this module supports the setting of the dancer's movement parameters. As shown in FIG. 4 which illustrates a working example of one of the dancers or Main Dancer MD. The movable parts of each of the dancers, MD, BD1, and BD2 are the elbows EL, the arms AR, the legs LG, as well as sections such as the head, the upper body, the wrists, the hands and the like. Should the system have sufficient data processing capacity, it is possible to further divide these sections as necessary into movable parts such as the shoulders, the chest, the hips and the like.

[Procedure for Setting Parameters]

Figure 5:
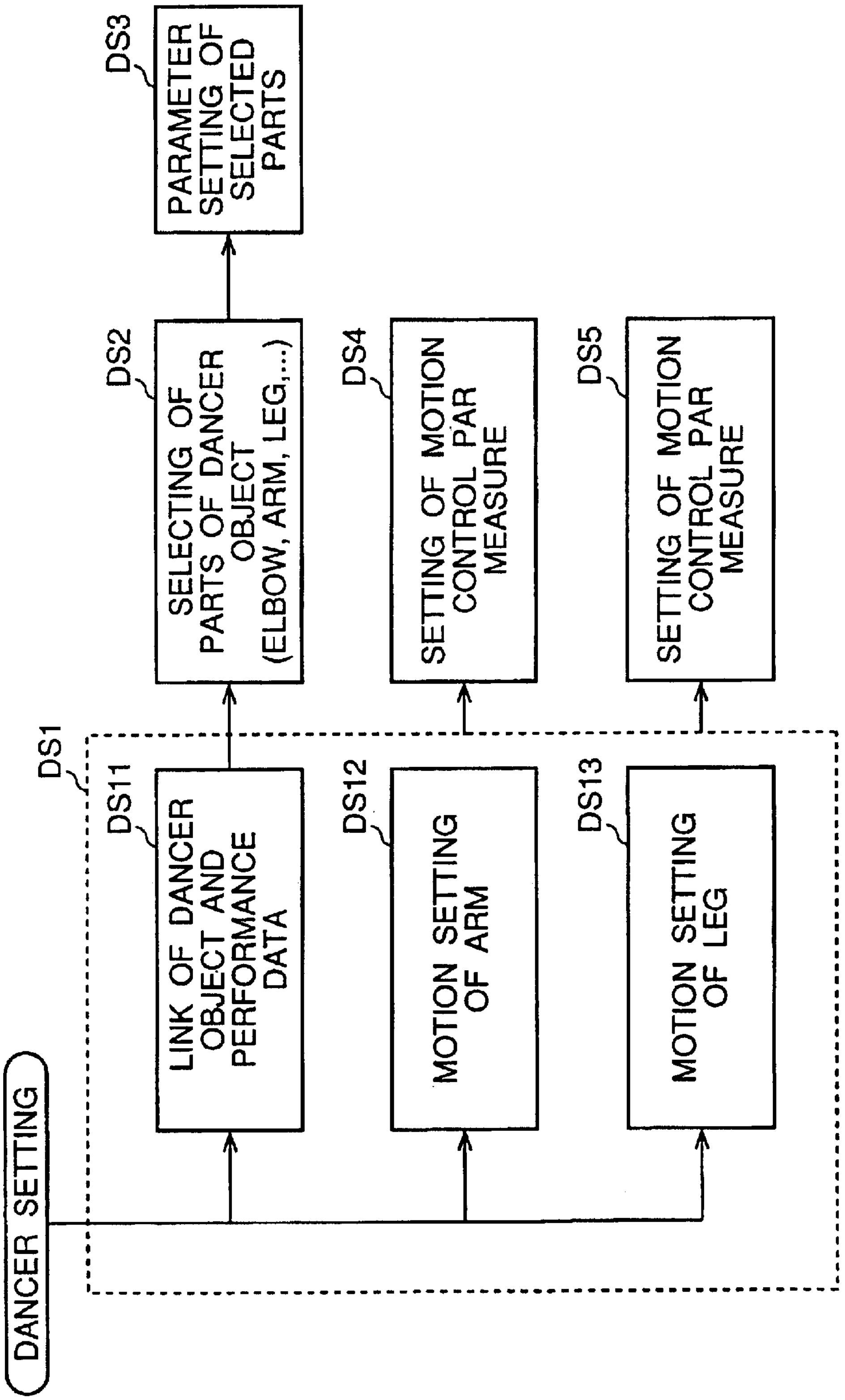
FIG. 5 is a conceptual view of the setting procedure activated in dancer settings mode under the music responsive image generation method of one embodiment of the present invention.

FIG. 5 shows an outline of the setting procedure using the dancer setting module when the video source module I is in dancer setting mode. In this mode, each dancer is associated with performance data, and the movements of the dancer's movable parts are selected and set. In dancer setting mode, as shown in FIG. 5, each dancer is associated with performance data in block DS11. In block DS2, the moving items of the dancers' movable parts are selected. In block DS3, each of the parameters such as performance data channels or attenuation values are set for each movement item. In this example, the movement is set in block DS 12 for the arm section AR among the selected movable parts, and specific movement control is set in detail par musical bar units in DS4. Similarly, the movement for the leg section LG can be set in block DS13, and the movement control can be set in detail par musical bar units in block DS5. The other movable parts, such as the elbow section EL, the head, the upper half of the body, the wrists, the hands and the like, can be designed to allow the same detailed settings.

Figure 6:
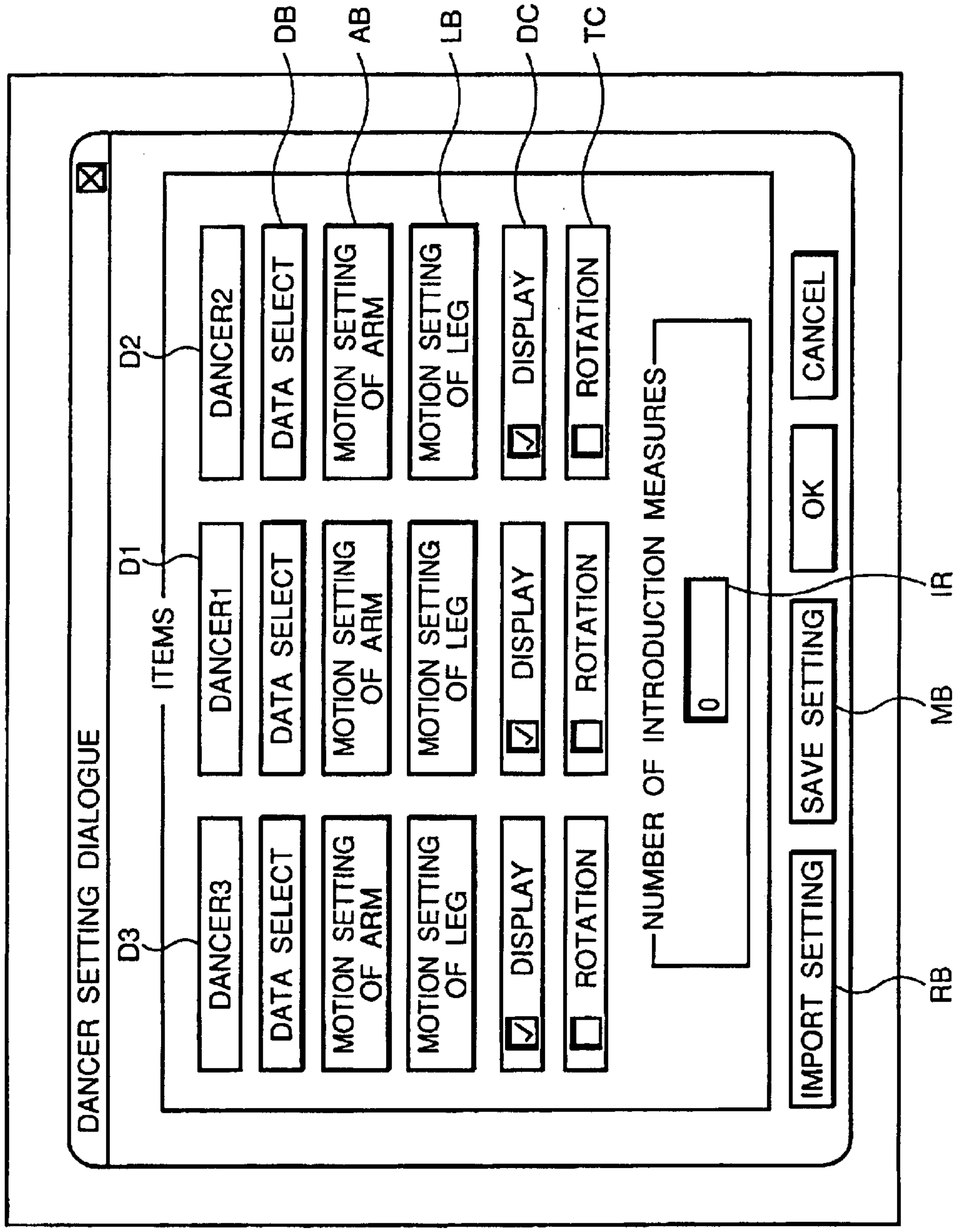
FIG. 6 shows the "dancer settings" dialogue screen of the dancer settings mode.
Figure 7:
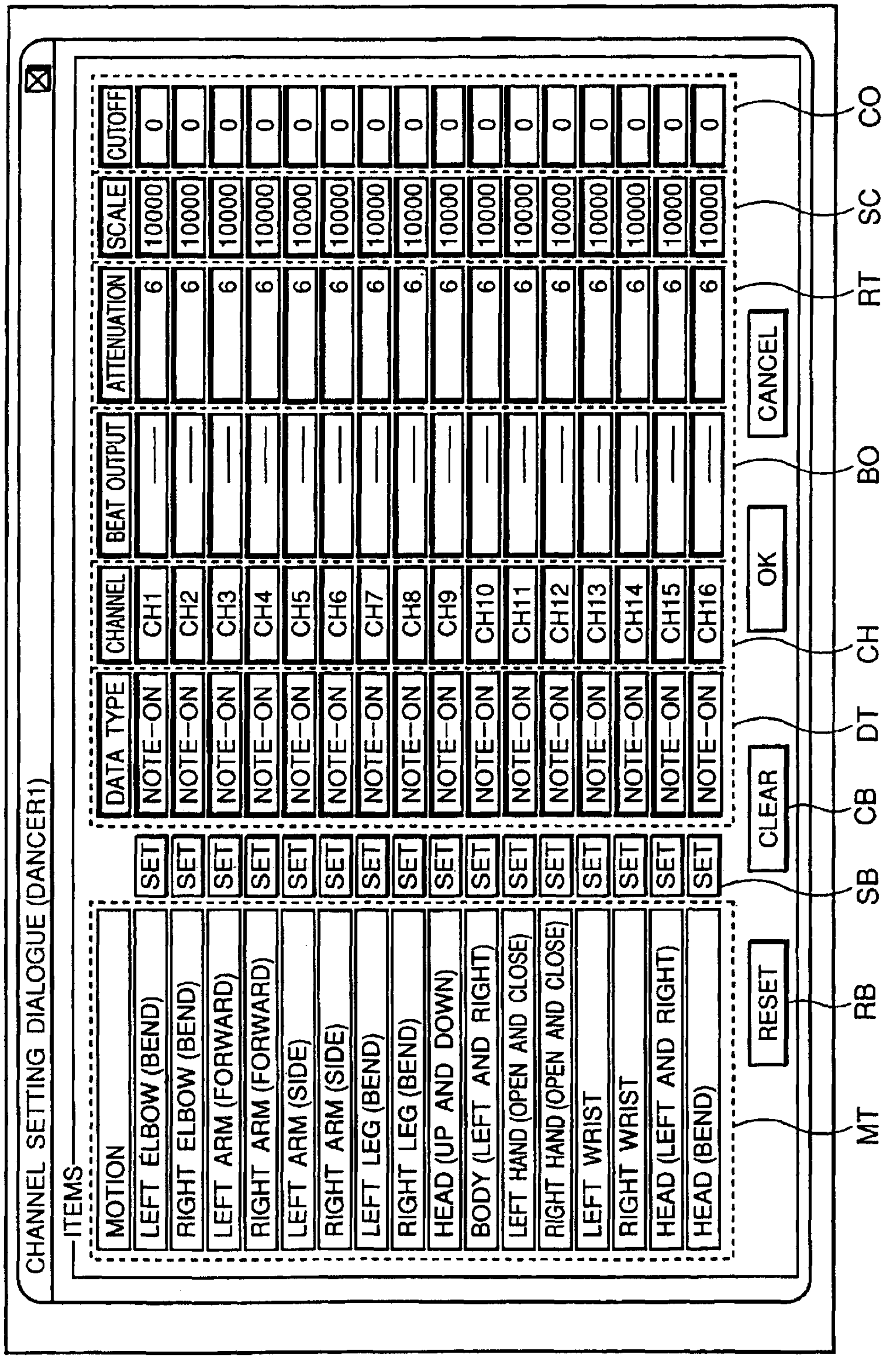
FIG. 7 shows the "Channel Settings" dialogue screen in the dancer settings mode.
Figure 8:
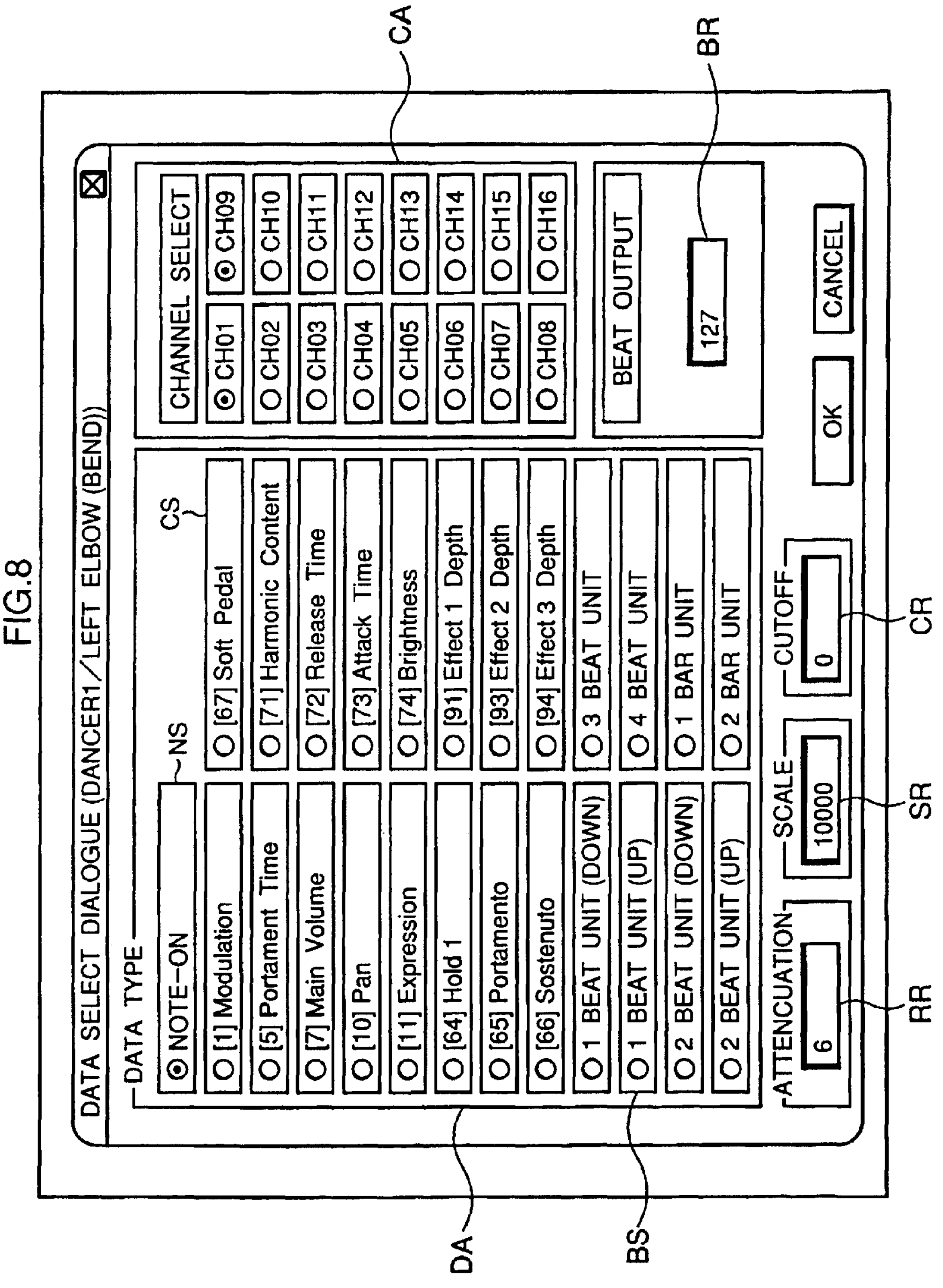
FIG. 8 shows the "Data Selection" dialogue screen in the dancer settings mode.
Figure 9:
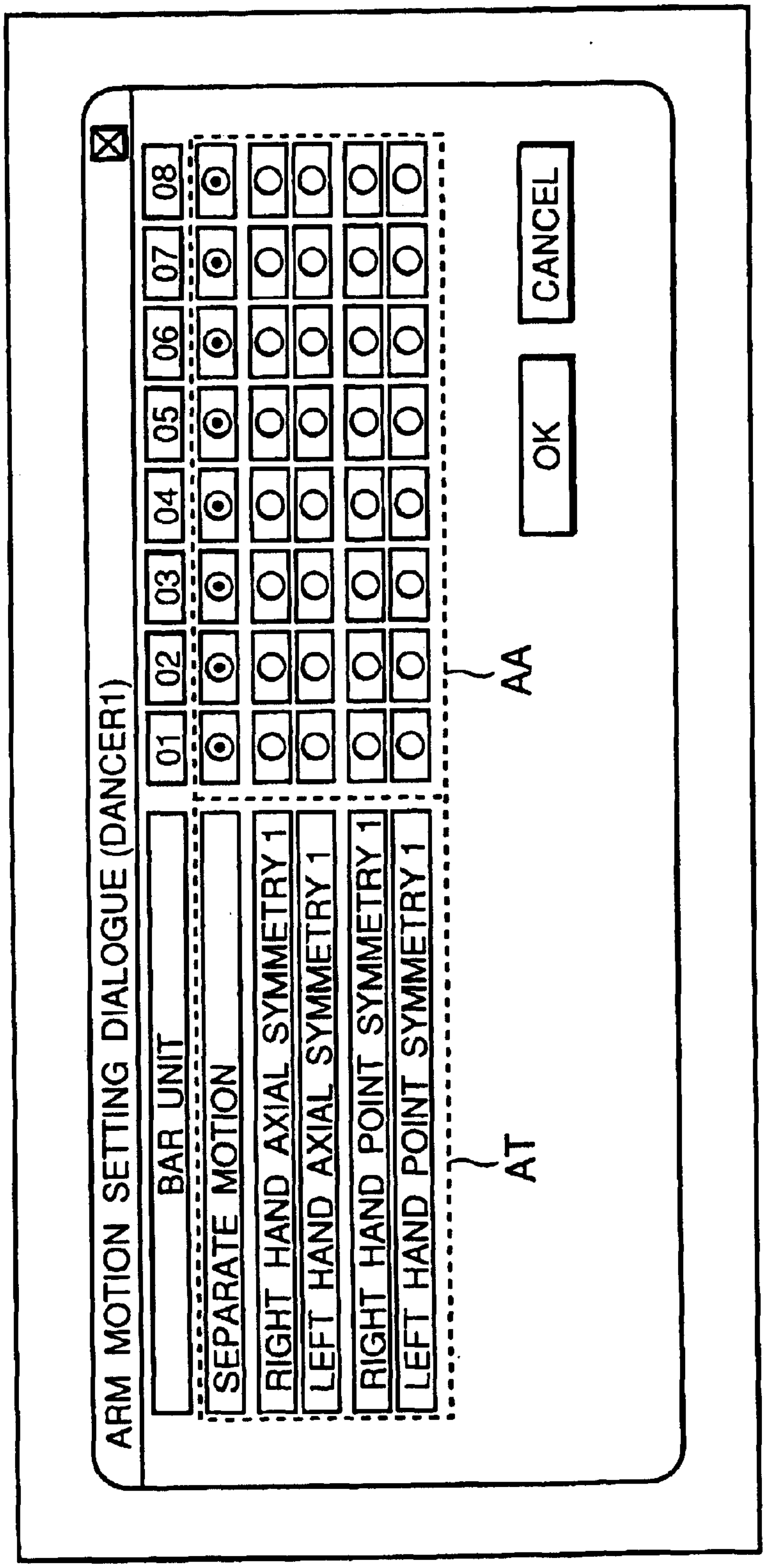
FIG. 9 shows the "Arm Movements" dialogue screen in the dancer settings mode.
Figure 10:
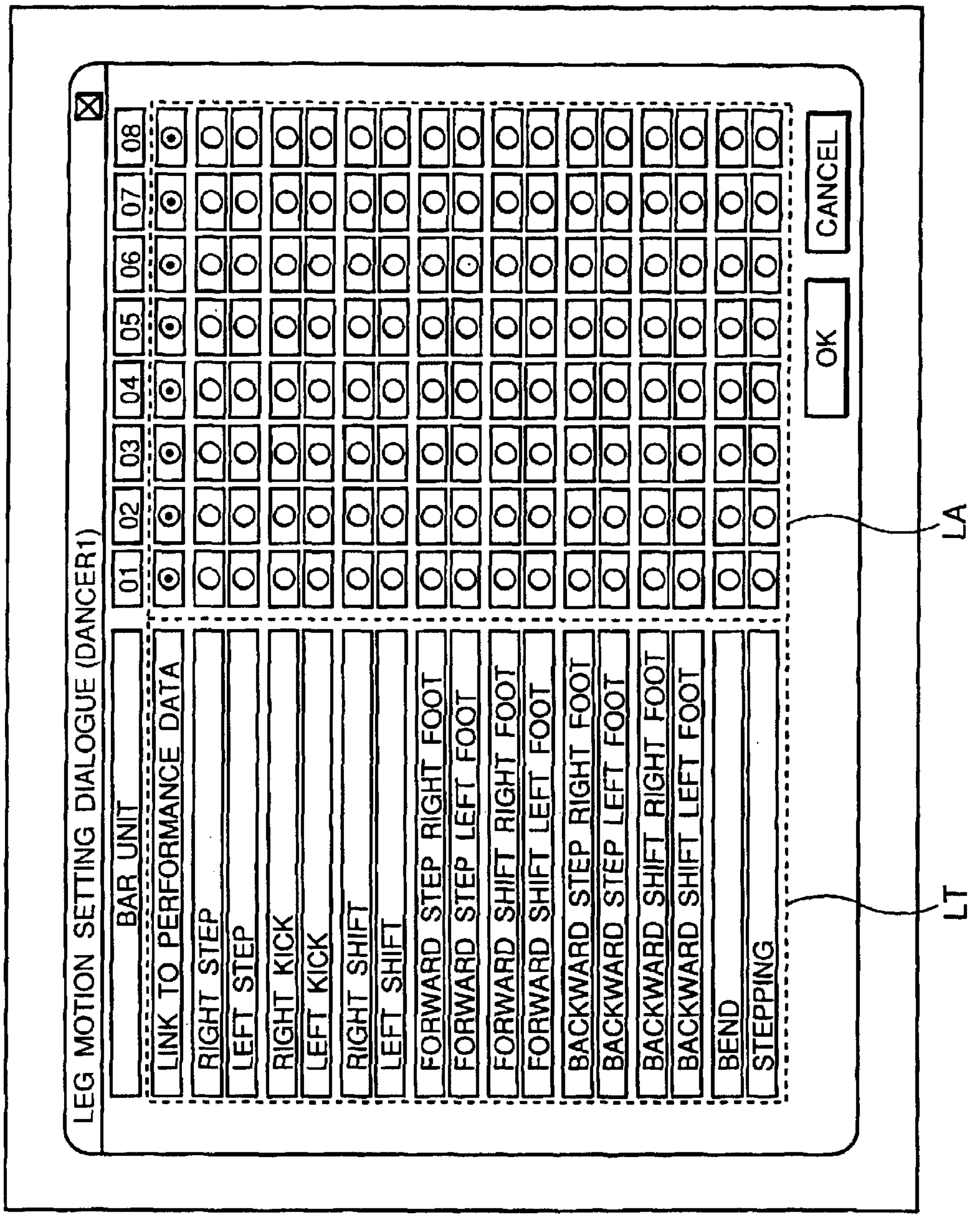
FIG. 10 shows the "Leg Movements" dialogue screen in the dancer settings mode.

FIG. 6 shows the "Dancer Settings" dialogue screen corresponding to the vertical block DS1, including blocks DS11, DS12, and DS13 of FIG. 5. FIG. 7 shows the "Channel Settings" dialogue screen corresponding to block DS2. FIG. 8 shows the "Data Selection" dialogue screen corresponding to block DS3. FIG. 9 shows the "Arm Movement Settings" dialogue screen corresponding to block DS4. FIG. 10 shows the "Leg Movement Settings" dialogue screen corresponding to the block DS5. Switching this system into Dancer Settings Mode using the input device 4 first brings up the dialogue screen of FIG. 6 on the display 12, whereupon it is possible to make the settings shown in the vertical block DS1 of FIG. 5. In the dialogue screen depicted in FIG. 6, the columns D1, D2, and D3 of the "Dancer 1", "Dancer 2", and "Dancer 3", which correspond to the Main Dancer MD, the Background Dancers BD1 and BD2, respectively display the "Data Selection" button DB, corresponding to block DS11, for associating each dancer with the performance data; the "Arm Movement Settings" button AB, corresponding to block DS12, for setting the lateral symmetry of the arm movements; and the "Leg Movement Settings" button corresponding to block DS13, for setting the rhythmical stepping movements of the legs. In addition, each of the columns are provided with a "Display" checkbox DC, for individually setting or displaying whether each dancer is to be projected onscreen; as well as with a "Turn" checkbox TC, for individually displaying and setting whether each dancer is to make a turning movement. The selection of the "Turn" checkbox TC in dancing mode activates rotation processing, so that each of the dancers in their entirety appear to be turning at the same specified speed (each of the pedestals appear to be turning) in dancing mode.

The IR component that determines and displays the number of intro bars sets the number of beats in the introduction of the music, only during bending movements, and displays this number. A "Read Settings" button RB for reading the movement parameters from the file is provided in the lower half of the screen, as well as a "Save Settings" button MB, for saving the movement parameters to file, an "OK" button, and a "Cancel" button.

[Performance Data Selection Settings Protocol]

When presented with the "Dancer Settings" dialogue screen of FIG. 6, clicking on the "Performance data Selection" button DB of "Dancer 1" Column D1, for example, brings up the "Channel Settings" dialogue screen, shown in FIG. 7, on the display 12. With the help of this screen, it is possible to select the type of MIDI data, channels, beat and the like which correspond to the movements of the Main Dancer MD.

FIG. 7 shows the default setting parameter obtained through the operation of the "Reset Settings" button RB. The various movement items of the dancer's movable parts such as the elbows, arms, legs, head, upper body, wrists, hands and the like are listed under the movement items column MT of the "Channel Settings" dialogue screen, and the "Set" button SB as well as the various movement parameters corresponding to these movement items are displayed. The various movement parameters, as in FIG. 7, can be set and displayed in the "Data Type" column DT, the "Channel" column CH, the "Beat Output" column BO, the "Attenuation" column RT, the "Scale" column "SC, and the "Cutoff" column CO. Whenever necessary, the default setting parameters of each of the movable parts are preset according to the dancer's basic movement patterns corresponding to the desired music type. During the startup process of the dancer settings mode, or other similar situations, it is possible to display default setting parameters such as the above-mentioned by using the appropriate reading methods.

In one example of a display of the default setting parameters shown in FIG. 7, the MIDI data channels 1CH through 16CH are set as the channel numbers Cn which respond to the 16 movement items in the movement items column MT, including "Left elbow (bend)", "Right elbow (bend)", "Left arm (to the front)". "Head (left/right direction)", and "Head (incline)". The data type Vd of the responding MIDI data is set to "Note On" data for each of the movement items. In addition, the "Attenuation" value Va is set to 6, the "Scale" value Vs is set to 1.0000, the "Cutoff" value Vc is set to 0, and the "Beat Output" value Vb is not set.

To obtain desired movement parameters by changing these default setting parameters, the user clicks on the corresponding Set button SB to bring up the various movement items of the movement item column MT. For example, should the Set button SB for the movement item "Left elbow (bend)" be pressed, the Data Selection dialogue screen for setting the respective parameters of the channel number Cn, the attenuation value Va and the like will appear onscreen, as shown in FIG. 8. This dialogue is provided with a "Data Type" setting area DA comprising a "Note On" setting section NS, a "Control" selection setting section CS, and a "Beat Type" selection setting section BS, as well as a "Channel Selection" setting area CA. Other areas are provided with a "Beat Output Value" settings display section BR, a "Movement Attenuation Value" settings display section RR, a "Movement Scale" settings display section SR, a "Cutoff" settings display section CR, and the like.

To select and set the type of performance data of this movement item "Left elbow (bend)" on the "Data Selection" dialogue screen shown in FIG. 8, the corresponding data type Vd must be selected by choosing one of the setting areas, specifically NS, CS, or BS, of the "Data Type" setting area DA. The "Note On" setting section NS and the "Control" selection settings section CS both function as data type Vd, to which the movable parts respond, in order to select and set the event Iv from among the MIDI data. The "Control" selection settings section CS selects as "Control" data one of the following: (1) Modulation; (5) Portament/Time, . . . , (94) Effect 3 Depth, which are picked up from the so-called Control Change function, and this can be set as Event Iv. The "Note On" setting section NS can also be designed as a "Note On/Off" selection setting section for choosing "Note On" or "Note Off", so as to have the capability of also responding when set to "Note Off".

The Beat Type selection setting section BS is for selecting and setting any "Beat Type" data Bt from among various beat types comprising 1 beat unit <Down>", "1 beat unit <Up>", "2 beat units<Down>" . . . "2 bar units", as data types Vd to which the movable parts should respond.

The "Channel Selection" setting area CA is an area for selecting and setting any Channel number Cn, which causes movement, from among 16 channels CH1 through CH16. The Channel Number Cn selected and set here is effective when either of the setting sections NS or CS of the Data Type setting area DA has been selected, and an event Iv, specifically, "Note On" data or "Control" data, has been selected and set as a type of performance data.

The Beat Output Value settings display section BR, provided on the right side of the "Beat Type" selection setting section BS of the "Data Type" setting area DA, is a display area for setting the beat output velocity Vb within the range of 0 to 127 (7 bits) in terms of "Beat Output Value". The selected and set beat output value Vb is effective when the Beat Type data Bt of the selection setting section BS has been selected and set.

The "Movement Attenuation Values" settings display section RR, provided at the bottom of the Data Selection dialogue screen, is a display area for setting the Movement Attenuation values (velocity attenuation values) Va within the range of 0–127 (at 7 bits), which determines the rate of return of the movable parts to the default positions (including angles). By using the input device 4, choosing this display area, and operating the numerical keys, it is possible to display and set the desired movement attenuation values. Also, the "Movement Scale" settings display section SR is a display area for setting the movement scale of each of the movable parts of the 3-D image objects such as Main Dancer MD and Background Dancers BD1 and BD2 (FIG. 3) at the magnification value Vs where the standard value is "1.0000". The "Cutoff" settings display section CR is a display area for setting the minimum value Vc of the velocity value contained in the performance data. All of the aforementioned can be set showing the desired values in the same way as the settings display section RR.

FIG. 8 illustrates a display in which the data items set in the "Data Type" setting area DA and the "Channel Selection" setting area CA is each represented by a "on setting mark on the left side of each of their display areas. For "left elbow (bend)" command for "Dancer 1", the display indicates that "CH1" is selected as the Channel-number Cn with "Note On" data selected as the event Iv. Since the "Beat Type" data Bt is not selected in the "Beat Type" selection setting section BS, the "127" of the beat output value Vb of the settings display section BR is invalid. In addition, each of the settings display sections RR, SR and CR show the settings of the movement attenuation value Va at "6", the movement scale value Vs of the "Left Elbow (bend)" of the Main Dancer MD at the standard value of "1.0000", and the cutoff-value Vc at zero ("0").

Clicking on the "OK" button or the "Cancel" button returns the user to the "Channel Settings" dialogue screen of FIG. 7. The movement parameters of the command "Left Elbow (bend)" for the Dancer 1 are changed when the "OK" button is pressed after they have been set. They remain set to the original default setting parameters if the "Cancel" button is pressed, signifying no changes. Using the same steps, it is possible to change the other movement parameters of the movement items in column MT to the desired parameter settings.

After setting or confirming all of the movement parameters related to Dancer 1's "Performance data Selection", the user is returned to the "Dancer Settings" dialogue screen of FIG. 6 by clicking on either the OK button or the Cancel button of the Channel Settings dialogue screen of FIG. 7. Using the same steps, it is possible to set or confirm the movement parameters related to the Performance Data Selection of the Dancer 2.

In FIG. 7, double-clicking on the Reset button reverts the settings of the movement parameters corresponding to all of the movement items to the default setting parameters. Clicking on the Set button after clicking on the Reset button reverts the settings of the movement parameters of the movement items corresponding to the Set button to the default setting parameters. Also, double-clicking on the Clear button sets the movement parameters corresponding to all of the movement items to zero, or leaves them unset. Clicking on the Set button after clicking on the Clear button reverts the settings of the movement parameters of the movement items corresponding to the Set button to zero or leave them unset.

[Movement Settings Procedure for Arm Section and Leg Section]

On the "Dancer Settings" dialogue screen of FIG. 6, clicking on, for example, the "Arm Movement Settings" button AB of the "Dancer 1" Column D1 brings up the "Arm Movement Settings" dialogue screen on the display 12 as shown in FIG. 9. With the help of this screen, it is possible to set the movements of the Main Dancer MD's arm section AR (FIG. 4) in musical bar units relative to lateral symmetry.

On the "Arm Movement Settings" dialogue screen in FIG. 9, the symmetrical movements of the dancer's arms are classified into items such as "Left side/Right side Movements", "Right Hand Axial Symmetry 1", . . . , "Left Hand Point Symmetry 1", which are listed in Column AT of the "Arm Movement Settings". A settings display area AA, for setting and displaying those left-right symmetrical arm movements in eight bars "01"–"08", is provided on the right side of the item column AT. Thus, the movements occurring in dancing mode are a continuous repeating cycle of 8 bars. It is possible to set the symmetrical movements of just the arm section AR in "Arm Movement Settings", but it is also possible to include the movement settings, for the elbow section EL and the hands related to the arm section AR. Should this prove to be unnatural-looking, it is possible to set the symmetrical movements of the elbow section EL and the hands separately.

The parameters set to correspond to the arm movements listed in the "Arm Movement Settings" column AT override the parameters set using the dialogue screens of FIGS. 7 and 8. Therefore, when "Left side/Right side Separate Movements" are set as the parameters in dancing mode, the arms on the left and right sides of the dancer's body move separately in correspondence with the MIDI data. On the other hand, "Right Hand Axial Symmetry 1" through "Left Hand Point Symmetry 1" are set to cause the arm section AR on the left and right sides of the dancer's body to move symmetrically. In other words, when "Right Hand Axial Symmetry 1" is set in dancing mode, the right arm section, which is a movable part, is made to move in an axially symmetrical manner subject to the left arm section. When "Left Hand Axial Symmetry 1" is set, the left arm is made to move in an axially symmetrical manner subject to the right arm section. When "Right Hand Point Symmetry 1" is set, the right arm section is made to move in a point symmetrical manner subject to the left arm section. Also, when "Left Hand Point Symmetry 1" is set, the left arm section is made to move in a point symmetrical manner subject to the right arm section.

In the examples shown in FIG. 9, the "o" mark in the settings display area AA indicates that the "Arm Movement Settings" parameters are set to "Left side/Right side Separate Movements" which causes the left and right arms to move separately during all eight bars. After finishing or confirming this setting, clicking on the "OK" or "Cancel" button returns the user to the previous "Dancer Settings" dialogue screen (FIG. 6). Using the same steps, the "Arm Movement Settings" of the other dancers BD1 and BD2 can also be set.

Next, clicking on the "Leg Movement Settings" button LB in the "Dancer 1" column in the "Dancer Settings" dialogue screen in FIG. 6 brings up the "Leg Movement Settings" dialogue screen shown in FIG. 10 on the display 12. With the help of this screen, it is possible to set the movements of the leg section LG (FIG. 4) of the Main Dancer MD to specific movements such as stepping movements in time to the beat.

On the "Leg Movement Settings" dialogue screen of FIG. 10, the movements of the dancer's legs are classified into leg movements such as "Link to Performance Data", "Right Step", . . . , "Stepping", which are listed in the "Leg Movement Settings" Column LT. In the same manner as the "Arm Movement Settings", a settings display area LA, for setting and displaying these leg movements to the top eight bar units "01"–"08", is provided on the right side of the item column LT. Therefore, the movements made in dancing mode are a continues repeating cycle of the top eight bars, and are in sync with the arm movements.

The parameters set to correspond to the leg movements listed in the "Leg Movement Settings" column LT override the parameters set using the dialogue screens of FIGS. 7 and 8, when these movements prove to be in conflict. When the parameters are set to "Link to Performance data", the legs are linked to the MIDI data in dancing mode. Meanwhile, "Right step"—"Stepping" are used to set predetermined leg movements in time with the selected beat.

When "Right step" is set, for leg movements in time with the beat, the object moves a half-step to the right in dancing mode. When "Left step" is set, it moves a half-step to the left. When "Right kick" is set, the right leg makes a kicking movement to the right. When "Left kick" is set, the left leg makes a kicking movement to the left. When "Right shift" is set, it moves one step to the right. When "Left shift" is set, it moves one step to the left. In addition, when "Forward step right foot" is set, it moves a half-step forward from the right leg and returns to its original position. When "Forward step left foot" is set, it moves a half-step forward from the left leg and returns to its original position. When "Forward shift right foot" is set, it moves forward one step to the right and returns to its original position. When "Forward shift left foot" is set, it moves forward one step to the left and returns to its original position. Furthermore, when "Step backward right foot" is set, it moves backward a half-step to the right and returns to its original position. When "Step backward left foot" is set, it moves backward a half-step to the left and returns to its original position. When "Shift backward right foot" is set, it moves one step backward to the right and returns to its original position. When "Shift backward left foot" is set, it moves one step backward to the left and returns to its original position. When "Bend" is set in dancing mode, it immediately bends both knees. When "Stepping" is set, it immediately begins to make stepping movements.

In the examples shown in FIG. 10, the "°" mark in the settings display area LA indicates that the "Leg Movement Settings" parameters are set to "Link to MIDI data" which links the leg movements to the MID performance data during all eight bars. After finishing or confirming this setting, clicking on the "OK" or "Cancel" button returns the user to the previous "Dancer Settings" dialogue screen (FIG. 6). Using the same steps, the "Leg Movement Settings" of the other dancers BD1 and BD2 can also be set.

As described above, after setting the various parameters corresponding to the music that should be played, it is possible to save the series of set parameters, to which the titles and genres and the like of the music can be attached, to a file in the external memory device 5 by clicking the "Settings Save" button MB in the "Dancer Settings" dialogue screen in FIG. 6. In this way, the user can set the number of dancers, such as Main Dancer MD, Background Dancers BD1 and BD2, and can also individually configure the settings of each of the dancers' respective body parts (FIG. 7). Also, when necessary it is possible to establish a procedure for setting the parameters for the outward appearance of each dancer, including clothing, skin color, hairstyle, gender, and the like, as a means for generating images that match the music being played.

[Procedure for Image Generation Processing]

Figure 11:
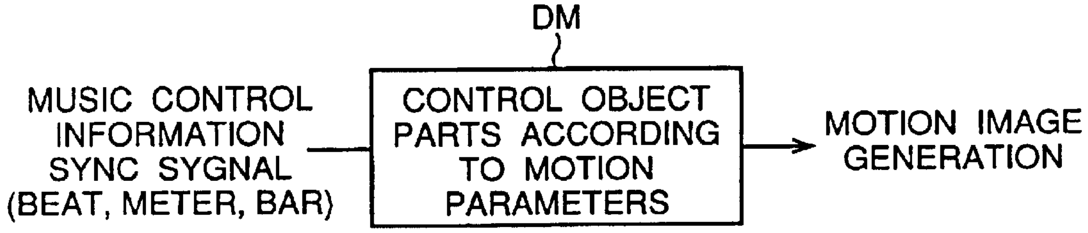
FIG. 11 shows the dance module DM, which is the main function of the video source module.

As shown in FIG. 11, the main function of the image video source module I features the use of the dance module DM to I process the sequential control of the movements of the dancers, which are 3-D image objects, in sync with the music. In image module I under dancing mode, the dance module DM receives music control data such as MIDI data, as well as synchronization signals such as a beat timing signal and a bar timing signal from the sequencer module S, and sequentially controls the movements of the respective movable parts of the dancers displayed on the display 12, in sync with the playing of the music, according to the set parameters. Namely, the inventive apparatus is constructed for animating an object along a music. In the apparatus, sequencer means is provided in the form of the sequencer module S for sequentially providing performance data of the music and a timing signal regulating progression of the music. Setting means composed of the setting module PS is operable for setting motion parameters to design a movement of the object. Audio means composed of the audio module A is responsive to the timing signal for generating a sound in accordance with the performance data to thereby perform the music. Video means composed of the video module I is responsive to the timing signal for generating a motion image of the object in matching with the progression of the music, the video module utilizing the motion parameters to form a framework of the motion image and further utilizing the performance data to modify the framework in association with the performed music.

Figure 12:
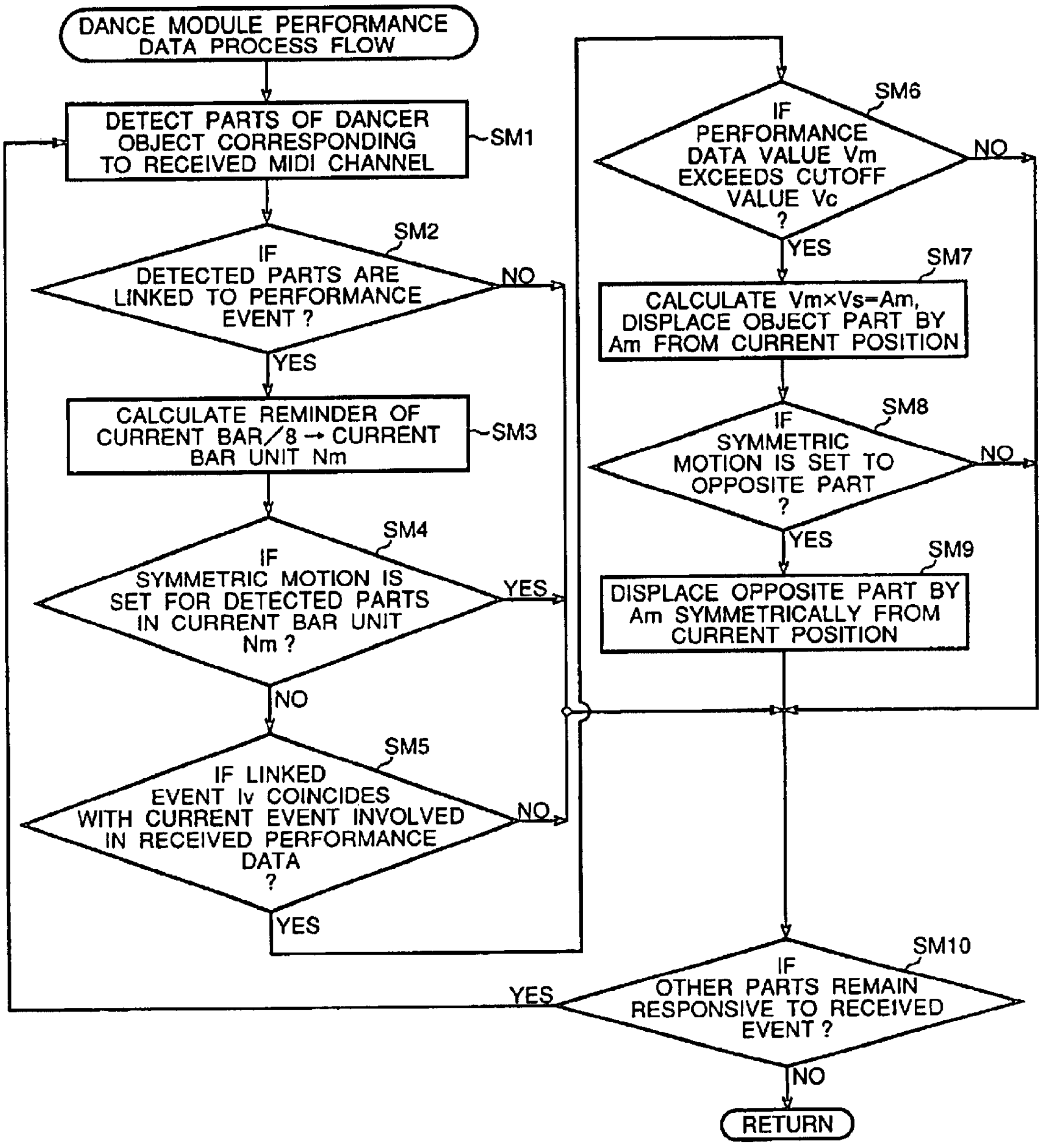
FIG. 12 shows the performance data process flow in the dancer settings mode.

FIG. 12 shows the performance data process flow SM by the dance module DM. This performance data process flow SM Is executed in dancing mode, and is applied when the movement parameters (FIG. 8, setting area NS, CS) corresponding to the event Iv, i.e., "Note On" or "Control", of the data type Vd selection settings (FIG. 7 "Data Type" column DT) are set. Therefore, this process flow SM is activated when performance event information (MIDI data) is received. Following is a detailed description of each step in the process flow SM.

[Step SM1]

The movable parts of the dancers set to the same Channel Number Cn as the channel of the received MIDI data are detected.

[Step SM2]

In Step SM2, the set parameters for the movable parts detected in Step SM1 are examined and it is determined whether the event Iv has been set. If the event Iv has been set (YES), the process proceeds to step SM3; if the event Iv has not been set (NO), the process proceeds to Step SM10.

[Step SM3]

In Step SM3, a sequential number of the current bar is divided by 8, and the remainder is calculated as a value representing the current bar unit (beat now) Nm (Nm: 0–7) from among the 8 bar units (see FIG. 9, "01"–"08").

[Step SM4]

In Step SM4, the parameter settings for the aforementioned movable parts are examined, and it is determined whether a symmetrical movement has been set in the current bar unit Nm calculated in the previous Step SM3. If a symmetrical movement has not been set (NO), the process proceeds to Step SM5, and if a symmetrical movement has been set (YES), the process proceeds to Step SM10.

[Step SM5]

In Step SM5, it is further confirmed whether the parameter settings of the movable parts match the event Iv of the received MIDI data. If it is confirmed as matching (YES), the process proceeds to Step SM6, and if it is not confirmed to match (NO), the process proceeds to Step SM10.

[Step SM6]

In Step SM6, it is determined whether the velocity value of the performance data (hereafter referred to as simply "performance data value") Vm of the MIDI data received in Step SM1 is greater than the setting cutoff value Vc. If it is found to be greater than the setting cutoff value Vc (YES), the process proceeds to Step SM7, and if it is less than the setting cutoff value Vc (NO), the process proceeds to Step 10.

[Step SM7]

In Step SM7, the movement amplitude value Am for the movable part is calculated from the formula: Performance data Vm×Movement Scale Value Vs=Movement amplitude value Am. The movable parts are moved to the target position Po, which is displaced from the current position by a distance equal to the movement amplitude of value Am; and are displayed in this target position Po, thus concluding processing of the movable parts. Namely, in the inventive system, the video module I utilizes the motion parameters to control the motion image of the object such that the movement of each part of the object is determined by the motion parameter, and utilizes the music control information controlling an amplitude of the sound to further control the motion image such that the movement of each part determined by the motion parameter is scaled in association with the amplitude of the sound.

Instead of immediately moving to the target position Po as described above, in moving display steps such as Step SM7 in which the movable parts are deliberately caused to move in response to the music, it is also possible to use Po as the target position, toward which parts are gradually moved from the original position by interpolation within the specified timing. Under this method, during the interpolation operation, it is desirable to keep a grasp of the moving status by applying flags to each movable part until they reach the target position (Po). In such a cse, the video module I successively generates key frames of the motion image in response to the synchronization signal according to the motion parameters and the music control information, the video module I further generating a number of sub frames inserted between the successive key frames by interpolation to smoothen the motion image while varying the number of the sub frames dependently on a resource of the system affordable to the interpolation.

[Step SM8]

In Step SM8, the movement parameters related to the movable parts are examined, and it is determined whether a symmetrical movement has been determined for a symmetrical movable part having a symmetrical relationship with the movable parts in the current bar unit Nm. If a symmetrical movement has been set (YES), the process proceeds to Step SM9. If a symmetrical movement has not been set (NO) the process proceeds to Step SM10.

[Step SM9]

In Step SM9, as described above, the movement amplitude value Am is calculated from the formula: Performance data Vm×Movement Scale Value Vs=Movement amplitude value Am. The symmetrical movable part is moved to the target position Po' which is displaced from the current position in a manner symmetrical with the aforementioned movable counterpart by a distance equal to the movement amplitude value Am (that is to say, a distance of −Am) and is displayed in this target position Po', thus concluding processing of the movable parts as in Step SM7. It is possible to use the target position Po' as the target position, toward which each part is moved during interpolation, within the specified timing.

[Step SM10]

In Step SM10, regarding the remaining movable parts that have not yet been processed, it is determined whether there are still movable parts that are to be moved at the event Iv of the received MIDI data. If there are such movable parts (YES), the process returns to Step SM1, and repeats Step SM1 and subsequent steps. In addition, if there are no such movable parts (NO), the process reverts to its first condition, where reception of subsequent MIDI data is awaited.

[Examples of the Performance Data Process Flow During Individual Movement]

Following is an example of a process flow of a specific movement parameter. Using the input device 4, the MIDI file is loaded into the system. By selecting the desired tune from this file, a series of movement parameters corresponding to the tune is read into the RAM 3. These movement parameters will be described below as those displayed in FIG. 6 through FIG. 10. Because the "Display" checkbox DC, shown in FIG. 6, is checked, Dancer 1 through Dancer 3 are selected as the displayed image objects to process. However, the "Turn" checkbox TC is not checked, so turn processing of the image display is not activated.

By following the specified procedure, it is possible to examine the received MIDI data once the musical rendition based on the MIDI data begins. First, "Left elbow (bend)" of "Dancer 1" is detected in Step SM1 as a movable part set to the same channel number Cn=CH1 as the channel CH1 of the MIDI data. Because the "Note On" event Iv of the MIDI data is set as the data type value Vd in this "Left elbow (bend)" command, it is read as "YES" in the next step SM2. After the current bar unit Nm is calculated in Step SM3, the process proceeds to Step SM4. Because the "Left side/Right side separate movement" (FIG. 9) is set for the arm in relation to the elbow of "Left elbow (bend)", and a symmetrical movement has not been set, it is read as a "NO" in Step SM4; after a match has been confirmed between the "Note On" Event Iv set in "Left elbow (bend)" and the "Note On" event Iv of the received MIDI data in Step SM5, the process proceeds to Step SM6.

Figures 13A, 13B, 13C:
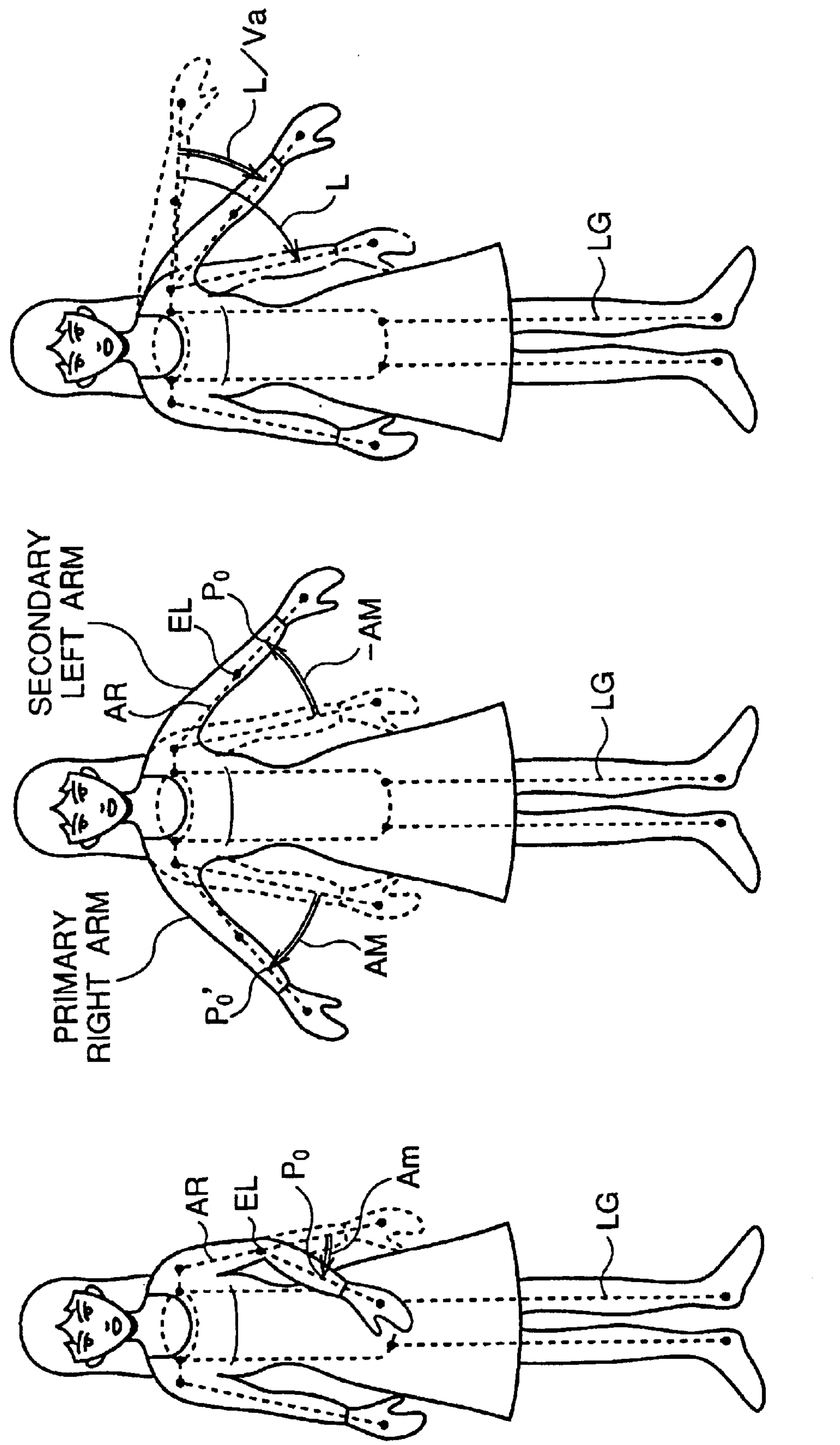
FIG. 13A is a conceptual view explaining the movements of the image objects in the dancing mode when individual movements have been set for the left and right sides.
FIG. 13B is a conceptual view explaining the movements of the image objects in the dancing mode when symmetrical movements have been set.
FIG. 13C is a conceptual view explaining the movements of the image objects when the attenuation process has been set in dancing mode.

In Step SM6, when the velocity value (in this case, a volume value, because "Note On" has been set) Vm of the received MIDI data is normally greater than the settings cutoff value Vc="1.0000", it is read as a "YES"; and in the following step SM7, the "Left Elbow" is displaced from its current position (in this example, as shown in FIG. 13A, the default position) to the target position Po bent by an angle equal to the size Vm×Vs=Vm×1.000=Am. Therefore, as FIG. 13A shows, this "Left Elbow" is displayed with the left arm bent to the target position Po. Then, the process proceeds to Step SM8. As described above, after being read as a "NO" in Step SM8 because there is no symmetrical movement set in the "Right Elbow (bend)" command, should there still be any movable parts that are to be made to move at the event Iv of the received MIDI data of Step SM10, the process returns to Step SM1 where the next movable parts to be processed are detected, and the same process has been repeated on these movable parts.

[Example of the Performance Data Process Flow During Symmetrical Movement]

For this example, "Left Hand Axial Symmetry" has been set as the movement parameter in "Arm Movement Settings" (FIG. 9). If the "Left Arm (Side)" is detected as a movable part in Step SM1, it is read as a "Yes" in Step SM4, and the process reverts to Step SM1 via Step SM10, for deletion from the individual processing of movable parts. Therefore, at this point, the left arm of "Dancer 1" does not, for example, respond to the "Note On" event Iv. However, when the "Right Arm (Side)" is detected as a movable part in Step SM1, it is then read as a "NO" in Step SM4, and the process passes through Step SM5 and Step 5M6, proceeding to Step SM7. First, the "Right Arm (Side)" is moved to the side for a distance equal to a movement value of Am. Next, after reaching Step SM9 through Step SM8, the "Left Arm (Side)", as a symmetrical movable part coupled with the "Right Arm (Side)", is moved a distance of the movement value "−Am". Therefore, as shown in FIG. 13B, the "Right Arm (Side)" and the "Left Arm (Side)" are displayed in the mutually symmetrical target positions Po and Po' as having moved a distance equal to the movement values "Am" and "−Am", respectively. The process then proceeds to the next step, in which it is determined whether there are more movable parts to be processed.

When all processing of the movable parts of the Dancers 1 through 3, which are responsive to the events of the received MIDI data, has been completed, the process waits for the transmission of the next MIDI data. By sequentially executing the performance data process of FIG. 7 with each transmission of MIDI data, the Dancers 1 through 3 appearing onscreen the display 12 can be made to dance in time with the ongoing music play of the MIDI data. Namely, the parameter setting module PS sets motion parameters effective to determine a posture of a dancer object, and the video module I is responsive to the synchronization signal for generating the motion image of the dancer object according to the motion parameters such that the dancer object is controlled as if dancing in matching with progression of the music.

[Procedure for Processing Beats]

Figure 14:
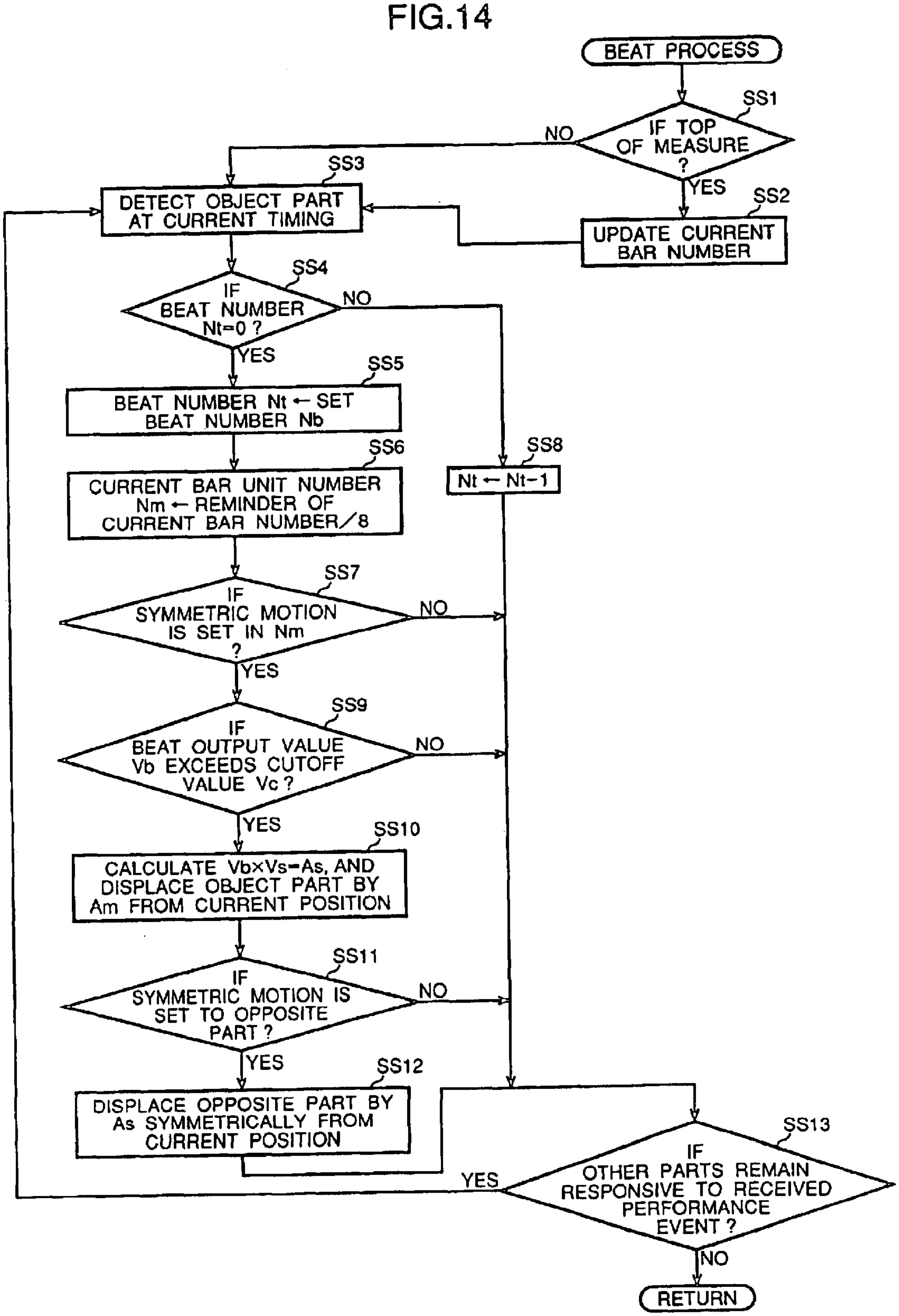
FIG. 14 shows a beat process flow in dancing mode.

FIG. 14 shows the beat process flow SS of the dance module. This beat process flow SS is executed in dancing mode. It is applied when the movement parameters of the "Beat Type" data so, Bt (FIG. 8 "Beat Type" Selection Setting BS) are set in the selection setting of the Data Type Vd (FIG. 7, DT). The movable parts subjected to this process are able to move rhythmically in time to the beat of the music play of the MIDI data. This beat process SS is synchronized with the beat timing accompanying the music play of the MIDI data, and is further activated regularly during the music play of the MIDI data via a beat timing signal having a resolution double that of the beat timing. With the use of this resolution, it is possible to adjust up-tempo beats and down-tempo beats (the timing of the beat on the up-phase and on the down-phase). The step-by-step process of this beat process flow SS is outlined below.

[Step SS1]

Upon reception of the beat timing signal, it is determined whether or not it is the beginning of the bar in Step SS1; should it be the beginning of the bar (YES), the process proceeds to Step SS2; if not (NO) the process proceeds to Step SS3.

[Step SS2]

In Step SS2, the number of bar is updated by adding 1 to the current number of bar nm ("nm+1"→nm). The process then proceeds to Step SS3.

[Step SS3]

In Step SS3, the movement parameters of the beat type (FIG. 8 BS) are examined, and the movable parts set to respond to the timing of the reception of the beat timing signal are detected.

[Step SS4]

In Step SS4, it is determined whether the current number of beat Nt of the detected movable parts is "O". If the number is "O" (YES), the process proceeds to Step SS5; if not (NO), it proceeds to Step SS8.

[Step SS5]

In Step SS5, the aforementioned number of beat Nt of the movable parts are replaced with the set beat unit Nb ("Nb"→Nt).

The set beat unit Nb is a movement parameter of the "Beat Type" data Bt (FIG. 8, the process BS) which, for example, takes on the value "Nb"=1 when it is set to "1 beat unit (down)"; again "Nb"=1 when it is set to "1 beat unit (up)"; "Nb"=3 when it is set to "2 beat units (down)"; and also "Nb"=3 when it is set to "2 beat units (up). Similarly, the value is "Nb"=5 when it is set to "3 beat units", and "Nb"=7 when it is set to "4 beat units". In other words, since these "ups" and "downs" have a temporal relationship with the beats of the rendition timing, the Nb value is not influenced. In addition, "1 beat unit" and "2 beat units" correspond to the number of beats nb per bar, and are, respectively, "Nb"=nb−1 and "Nb"=2nb−1.

[Step SS6]

In Step SS6, the remaining bar obtained after dividing the current bar by 8 is calculated as a value representing the current bar unit Nm.

[Step SS7]

In Step SS7, the movement parameters of the aforementioned movable parts are examined, and it is determined whether symmetrical movements in the current bar unit Nm, calculated in the previous Step SS6, have been set. If such symmetrical movements have not been set (YES), the process proceeds to Step SS9; if such symmetrical movements have been set (NO), the process proceeds to Step SS13.

[Step SS8]

Meanwhile, in Step SS8, the number of beat Nt of the aforementioned movable parts is updated by subtracting 1 ("Nt−1→Nt), after which the process proceeds to Step SS13.

[Step SS9]

In Step SS9, it is determined whether the beat output value Vb is greater than the settings cutoff value Vc. Should it be greater than the cutoff value (YES), the process proceeds to Step SS10. Should it be less than the value Vc, the process proceeds to Step SS13. It is possible to skip Step SS9 as necessary, since it is a confirmation step.

[Step SS10]

In Step SS10, the movement amplitude value Am for the movable parts is calculated from the formula: Beat output value Vb X Movement Scale Value Vs=Movement amplitude value As. The movable parts are moved to the target position Po, which is removed from the original position by a distance equal to the movement amplitude value As, and is displayed in this target position Po, thus concluding processing of the movable parts. These steps are the same as those used Step SM7 of the performance data process. Therefore, as in Step SM7, it is possible to use the target position Po as the target position, toward which the object is moved during interpolation, within the specified timing. During interpolation, it is desirable to keep a grasp on the moving status by applying flags to each movable part until they reach the target position.

[Step SS11]

In Step SS11, in the same way as in Step SM8, the movement parameters of the aforementioned movable parts are examined, and it is determined whether a symmetrical movement for a symmetrical movable part having a symmetrical relationship with the movable counterpart has been set in the current bar unit Nm. If a symmetrical movement has been set (YES), the process proceeds to Step SS12; if a symmetrical movement has not been set (NO), the process proceeds to Step SS13.

[Step SS12]

In Step SS12, in the same way as in Step SM9, the movement amplitude value As is calculated from the aforementioned "Beat Output Value" Vb×"Movement Scale Value" Vs=Movement amplitude value As. The symmetrical movable parts are moved symmetrically to the target position Po', a distance of −As; they ate displayed in this target position Po', and thus concludes processing. As in Step SS10, it is possible to use the target position Po' as the target position, toward which the object is moved during interpolation, within the specified timing.

[Step SS13]

In Step SS13, it is determined whether there are still movable parts which move in the aforementioned timing among the remaining movable parts that have not yet been processed. If there are such movable parts (YES), the process returns to Step SS3, and all steps below Step SS4 are repeated for applicable movable parts. In addition, if there are no such movable parts (NO), the process reverts to its initial condition, in which it awaits the reception of the next beat timing signal.

The beat process flow SS comprises the abovementioned Steps SS1–SS13. Under this beat process flow SS, should the movement parameters of the "Beat Type" data Bt (FIG. 8, BS) be set to "1 beat unit (down)", the movable parts are displaced, with every 1-beat down-timing, by a distance equal to the set beat output value Vb and the movement scale value Vs. Namely, the video module I is responsive to the synchronization signal utilized to regulate a beat of the music so that the motion image of the object is controlled in synchronization with the beat of the music.

[Procedure for the Attenuation Process]

Figure 15:
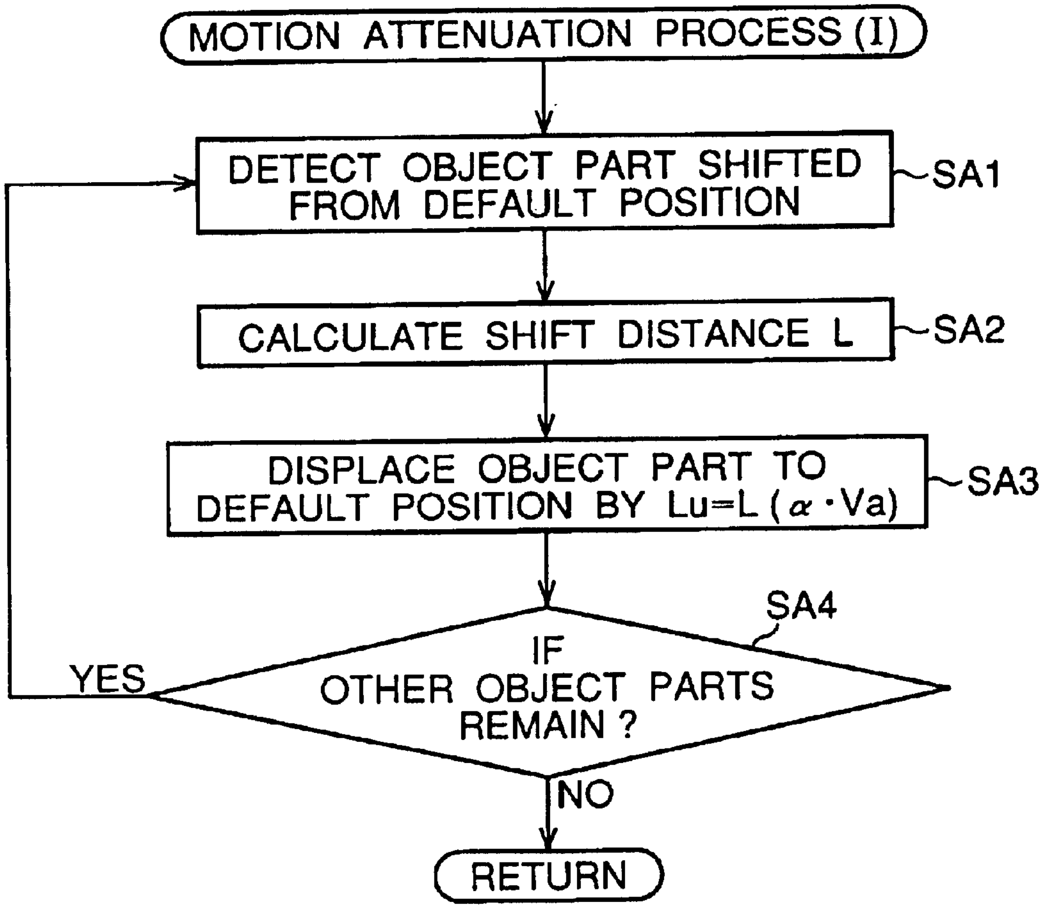
FIG. 15 shows an attenuation process flow in dancing mode.

In the inventive system, the video module I generates the motion image according to the motion parameters effective to determine the movements of the movable parts of the object with respect to default positions of the movable parts, the video module periodically resetting the motion image to revert the movable parts to the default positions in matching with the progression of the music. FIG. 15 shows such an attenuation process flow SA of the dance module as "Attenuation Process (I)". The attenuation process flow SA is designed to execute attenuation operations causing gradual movements, so that the movable parts, which have been displaced from the default position (including angles) in response to the music being played, by means of the various processes of FIG. 12 and FIG. 14, can revert to their default position from the current position. Therefore, the attenuation process can also be referred to as the reversion process. The attenuation process SA can be activated through the periodic interruption of the MIDI data during the rendition of the music. The attenuation process SA is activated by attenuation signals with a relatively long repeating cycle which would not appear visually unnatural. These timing signals can be synchronized with the beat timing, or else kept independent of the beat timing, with no synchronization. Following is the step-by-step process of the above-mentioned attenuation process (I) flow SA.

[Step SA1]

In Step SA1, upon reception of the attenuation timing signal, the current positions of each of the movable parts are examined, and those out of alignment with the default position are detected. The default position, which is the standard position of this detection process, is a position appropriate for dancing to the music, which is designated as the most natural and stable position for the movable parts. For instance, in this example, as shown in FIG. 4, the dancer is standing upright in a natural position. The default position can be assigned to any other position, as needed.

[Step SA2]

In Step SA2, the distance L from the current position to the default position is calculated as the detected position difference among the movable parts.

[Step SA3]

In Step SA3, the unit movement distance Lu=L (αVa) (α is a suitable fixed conversion constant) is calculated using the movement attenuation value Va obtained from the movement parameters of the movable parts. The movable parts are moved to a position displaced by a distance equal to a unit movement distance Lu away from the current position in the direction of the default position, and they are displayed at this position, at which point the attenuation operation process of the movable parts is complete.

[Step SA4]

In Step SA4, it is examined whether there are still movable parts that are to be attenuated at this time, among the remaining movable parts that have not yet been processed. If there are such movable parts (YES), the process returns to Step SA1, and repeats all of Step SA1 and subsequent steps. In addition, if there are no such movable parts (NO), the process reverts to its first condition, where reception of subsequent interruption signals are awaited.

In order to give a simple description of this attenuation process SA, the movements of dancers undergoing the attenuation process SA are outlined in FIG. 13C. For example, the default position of the dancer's "Left arm (side)" is displayed by a dash-dot line. When the left arm is at the current position represented by a broken line in FIG. 13C at the time of reception of the attenuation timing signal, the "Left arm (side)" is detected as a movable part in Step SA1. In Step SA2, the distance between the current position and the default position of the "Left arm (side)" is calculated. In Step SA3, the movement attenuation value Va among the movement parameters of the "Left arm (side)" is examined (FIG. 8, "Attenuation" column RT value "6"); the value L/Va=L/6 is calculated by dividing the distance L by this movement attenuation value Va=6, and the "Left arm (side)" is moved to the position indicated by the solid line which has been displaced equal to a unit movement distance Lu=L/6α, in the direction indicated by the dash-dot line.

As described earlier, it is possible to implement interpolated motion processes in movement display steps such as steps SM7, SM9, SS10, SS12 for the performance data process SM and the beat process SS. This enables the movable parts to move in response to the event Iv and the beat Bt, and to be displayed in a more natural way, rather than instantaneously. The interpolated motion processes are in some cases executed by routines other than that of these movement display steps, the movable parts are moved during interpolation toward the target position from their current position, and the process ends when the movable parts reach the target position. During interpolation, each movable part should be flagged until they reach the target position (Po), to allow the movement status of the movable parts to be grasped. In the interpolation, the video means successively generates key frames of the motion image in response to the timing signal according to the motion parameters and the performance data, and generates a number of sub frames inserted between the successive key frames by interpolation to smoothen the motion image while varying the number of the sub frames dependently on a resource of the system affordable to the interpolation.

Figure 16:
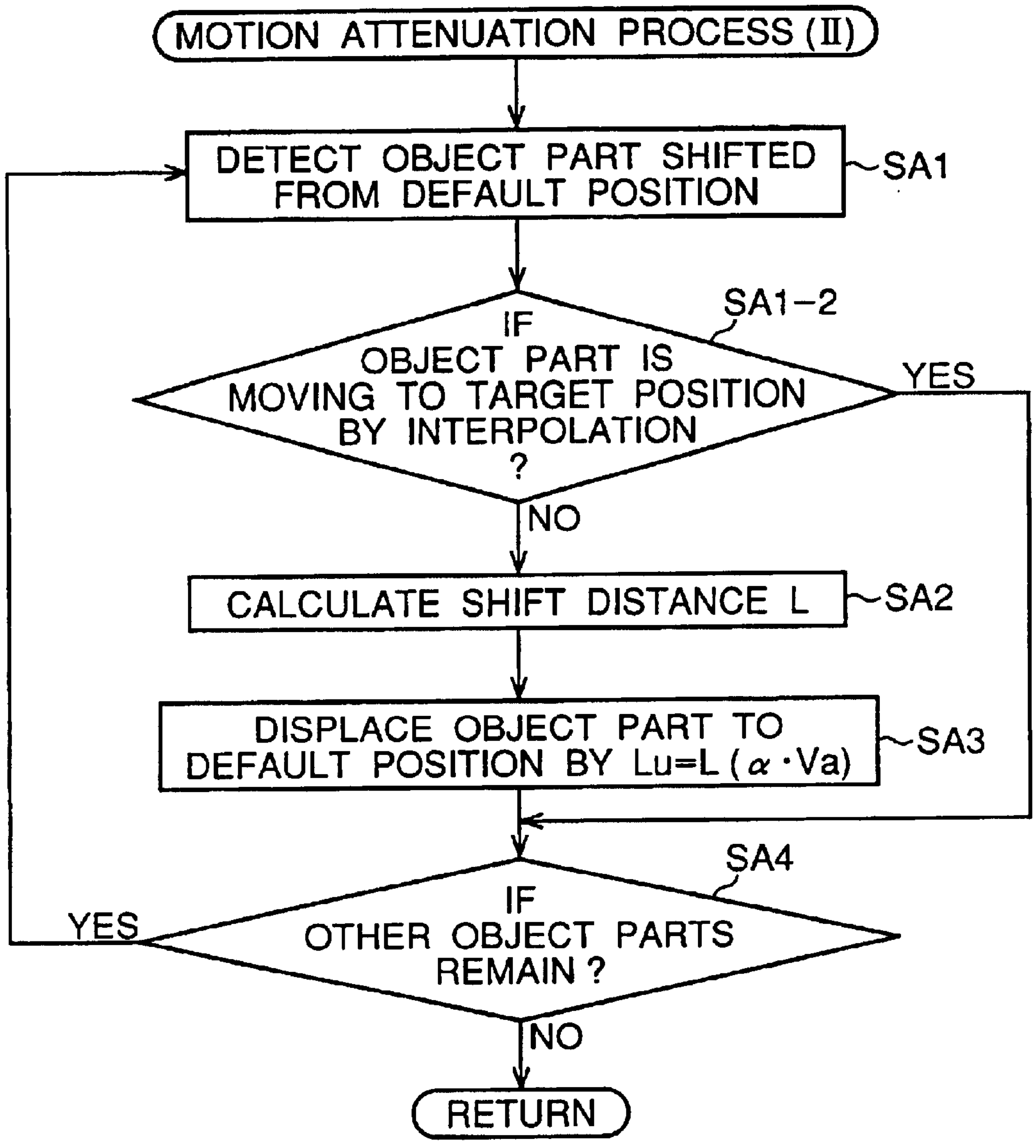
FIG. 16 shows another attenuation process flow in dancing mode.

FIG. 16 shows "Attenuation Process (II)" as another attenuation process flow SA of the dance module. The attenuation process flow SA shown here is applied when interpolated motion processes like the above are implemented. The difference between this "Attenuation Process (II)" and the "Attenuation Process (I)" of FIG. 15 is that, along with interpolation, "Step SA1-2" is inserted between steps SA1 and SA2.

[Step SA1-2]

In Step SA1-2, it is determined whether the movable parts whose current position was found in Step SA1 to be out of alignment with the default position are in the midst of interpolated motion. Should they be found to be in the midst of interpolated motion, the process proceeds to Step SA4, where it looks for other movable parts to be attenuated. If they are not found to be in the midst of interpolated motion, the process proceeds to Step SA2 to execute the attenuation process. It is possible to use the flags placed on the movable parts to grasp the movement status during interpolation.

Using the three processes, SM, SS, and SA, it is possible to sequentially control the movements of each of the dancers' movable parts, which have been synchronized with the ongoing rendition of the music control information. Because each of these movable parts is made to respond to the event (Iv) during the performance data process SM, and to the beat (Bt) during the beat process SS, the user also has at his fingertips a wide variety of movements. The symmetrical movements of those movable parts in symmetrical alignment are continuously processed by using the calculated value, as in steps SM7–SM9 and steps SS10–SS12, which simplifies the structure of the process.

Furthermore, in the case of reversion movements, during aggressive movements responsive to musical events and beats, it is possible to produce natural movement by resetting to the original form, by using a simple attenuation process SA. As for the displacement of these aggressive movements, that is to say, the position (including angles) of the displacement of steps SM7, SM9, SS10 and SS12, it is possible to displace the sections of the dancers to a stable and natural position using a standard or rest position as the default position of FIG. 4.

This completes the description of the working examples involving simple CG operation with various specific conditions regarding parameter settings mode (dancer settings mode) and image generation mode (dancing mode) when using dancers as image objects. These working examples are merely one example of use; modifications within the scope of the present invention can be made as necessary.

For example, regarding the standard position (including angles) of the displacement of steps SM7, SM9, SS10 and SS12 in the working examples, the standard position was set to the default position in order to simplify operation, but it is possible to make the movements of the image objects more complex and varied by setting the standard position to the current position, so that the changes in movement are more dramatic. In this way, the standard position is set to a new position which has been displaced to a greater velocity value than the specified value, creating modulated movement.

As for the display of visuals on the display screen, other than the aforementioned image object rotation (FIG. 6, TC <Turn Process>), diverse visual effects can be achieved by using various image settings, image processes, and visual embellishments. For example, for the image object itself, preference settings for outward appearances, such as clothing, skin color, hairstyle, gender and the like can be set. In addition, in image processing, it is possible not only to change the aforementioned camera position (point of view), or to make the image objects turn (FIG. 6, TC <Turn Process>), but also to create diverse lighting, light reflection or shadowing from one or a plurality of moving light sources. Furthermore, it is possible to change the light source, the colors and brightness of the background images, the camera position (zoom) and the like, according to the music control data or the synchronization signal; with the appropriate function keys for the input device 4 (FIG. 1), during visual display, various visual operations can be carried out artificially. In this way, it is possible to achieve even greater diversity of visual effects.

As for the concrete application of the performance data to the CG image processing, for example, it is possible to sequentially read the performance data somewhat in advance of the advancing music generated on the basis of the performance data, and to undergo CG analysis and estimate the amount of data, so as to prevent overloading, this also further improves the reliability of the synchronization of the generated music and each of the movable parts.

It is possible to generate high-quality images by using additionally analyzed results from the performance data for anticipatory control of the image objects. For example, by pausing not just one event, but a plurality of events at specified times, the position of the movable parts of an instrument player can be anticipated from the gathered note numbers of the "Note On" data. An example of this is the analysis of harmonies from the distribution of performance data (such as "Do", "Re", "Mi"). Based on this, for a scene with image objects such as a pianist playing the piano, the position of the wrists is anticipated, and the remaining arm data is also created.

Also, regarding the aforementioned interpolation process, it is possible to induce interpolated motion to the target position (Po) obtained in a movement display step such as Step SM7 by calculating the number of drawing frames from the tempo data and animation speed; or to have the image objects reach the target position in order within a specified time limit by interpolating to this target position (Po) in sync with the beat. In this way, it is possible to further improve the accuracy of the motion.

It is further possible to have the image objects play instruments based on the performance data obtained from the reception of the instrument performance data in the music data, that is to say, the so-called "Program Change" data contained within the MIDI data. For example, for the same "Note On" event, depending on the differences in this "Program Change" data, there are piano sounds and violin sounds. It is possible to assign special rendition movements to instruments that correspond to this data. The dancer settings module of the working example, as shown in FIG. 10, has movement templates. It is possible to specify instruments by developing these movement templates for the special rendition movements of the instruments.

[Pre-Read Analysis of the Performance Data]

In the pre-read analysis of the inventive system, the video module I analyzes a data block of the music control information for preparing a frame of the motion image in advance to generation of the sound corresponding to the same data block by the audio module, so that the video module I can generate the prepared frame timely when the audio module A generates the sound according to the same data block used for preparation of the frame.

As described above, for the concrete application of the CG image processing of the performance data, the performance data is sequentially pre-read in advance of the advancing music generated on the basis of the performance data. Analyzing and anticipating the CG images in advance prevents overloading, and this is also effective in further improving the reliability of the synchronization of the generated music and each of the movable parts. According to the preferred embodiments of the present invention, a pre-read pointer, separate from the playback pointer of the performance data is provided in order to execute such pre-read analysis. By using this pre-read pointer on the application side, the performance data can be analyzed in advance before the music play of the performance data.

Figure 17:
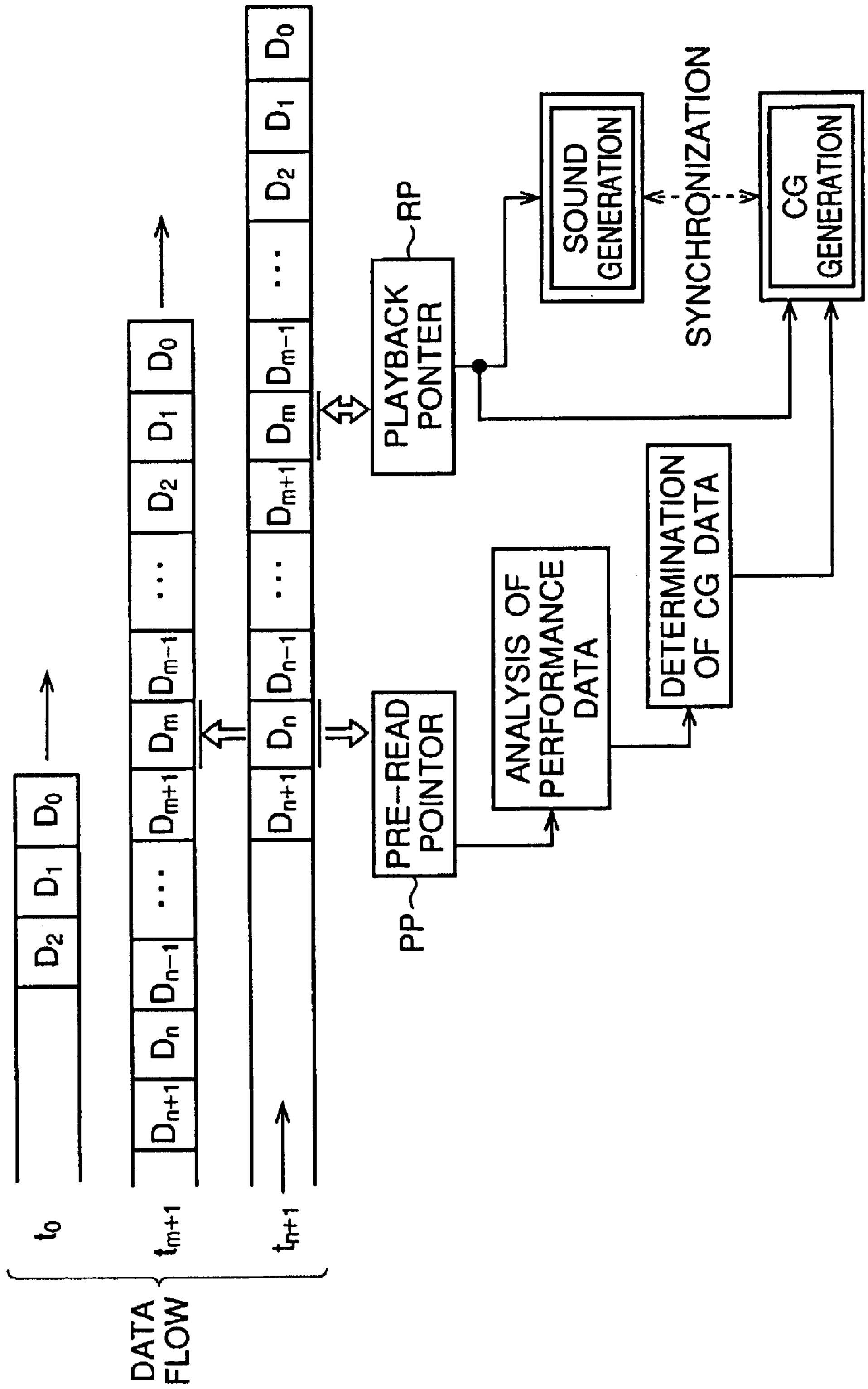
FIG. 17 is a conceptual view showing the basic principles of the pre-read analysis process of the present invention.

In compliance with the preferred embodiment of the present invention, FIG. 17 shows a schematic view of the theory behind the generation of CG images corresponding to the music play based on the results of the pre-read analysis of the performance data in dancing mode. As shown here, a playback pointer RP and a pre-read pointer PP are provided as read pointers for the pre-read analysis process of the present invention. The playback pointer RP is for controlling the positions of the data blocks currently being played, among the performance data comprising the performance data blocks $D_0$, $D_1$, $D_2$, . . . etc. As opposed to the playback data blocks controlled by the playback pointer RP, the pre-read pointer PP, provided separately from this playback pointer RP, has control over only those data blocks preceding, for example, by the specified number (n-m); and is a pointer for providing CG data to the aforementioned playback data block.

When the appropriate music is selected, the pre-read pointer begins the pre-read analysis of the performance data prior to reception of the image generation command, and stores the results of the analysis in the memory device. For example, when the data block Dm is specified among the performance data by the pre-read pointer PP at point $t_{m+1}$, the performance data of the data block Dm is analyzed, and from this performance data, the necessary event corresponding to the specified movement parameters is found. Using this event and the time of occurrence as determining materials, the CG data corresponding to the images to be generated at the playback time $t_{m+1}$ of the performance data is prepared, and is stored as the results of analysis. These results are read from the storage device when the music is generated from the performance data at time $t_{n+1}$, and the corresponding CG images are drawn in the display system DP.

Figure 18A:
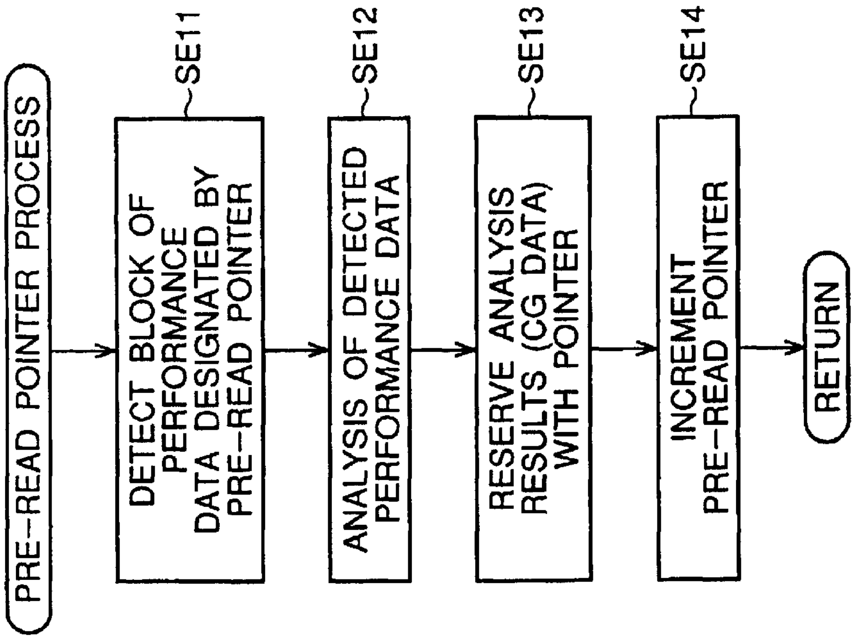
FIGS. 18A and 18B show the pre-read analysis process flow of one embodiment of the present invention, all of which show pre-read pointer and playback pointer processes.
Figure 18B:
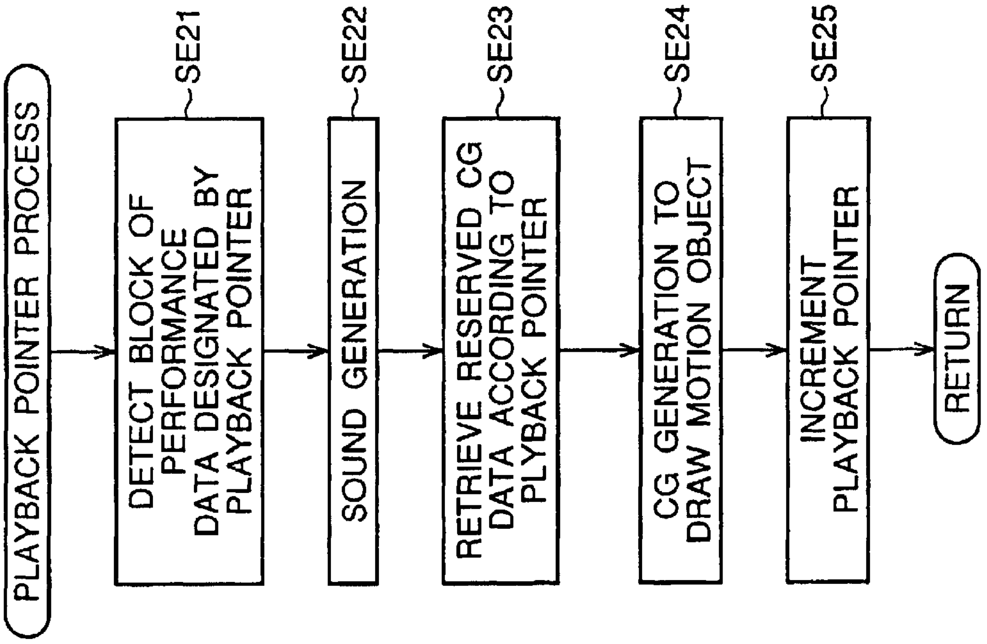

FIGS. 18A and 18B show one such example of a pre-read analysis process flow SE, comprising the pre-read pointer PP process and the playback pointer RP process. The playback pointer RP process must be activated by periodic interruption. Preferably, the pre-read pointer PP process is also activated by periodic interruption, although it may be set so as not to be activated when there is a greater load on other crucial processes (for example, the playback pointer process), but only when there is a reserve of power. By such a manner, the video means is designed for analyzing a block of the performance data to prepare a frame of the motion image in advance to generation of the sound corresponding to the same block by the audio means, so that the video means can generate the prepared frame timely when the audio means generates the sound according to the same block used for preparation of the frame.

[The Pre-Read Pointer PP Process]

In the pre-read analysis process flow SE, preparations for drawing are done in advance by the pre-read pointer PP process of FIG. 18A comprising the following steps SE11–SE14, after which the playback pointer process is begun as shown in FIG. 18B.

[Step SE11]

In Step SE11, when the pre-read pointer process is begun upon receipt of event information, the performance data of the data blocks specified by the pre-read pointer PP is detected. For example, in FIG. 17, the performance data of the data block Dm specified by the pre-read pointer PP at point tail is detected, and the process proceeds to Step SE12.

[Step SE12]

In Step SE12, the detected performance data Dm is analyzed. For example, the necessary events corresponding to the specified movement parameters are found from the performance data. These events and the time of occurrence are used as determining materials to determine the CG data corresponding to the images to be generated at the playback time $t_{m+1}$ of the performance data. In the analysis of this Step SE12, besides the performance data Dm, it is also possible to use the results of the analysis based on the performance data $D_{m-1}$, $D_{m-2}$ . . . of previously executed pre-read pointer processes.

[Step SE13]

In Step SE13, the CG data determined as the analyzed result of Step SE12 is stored in the memory device along with the pointer, and the process then proceeds to Step SE14.

[Step SE14]

In Step SE14, the pre-read pointer PP is advanced incrementally by one, after which it reverts to waiting for the next interruption.

[The Playback Pointer Process]

The playback pointer process, which comes after the pre-read pointer process comprising these steps SE11–SE14, consists of the following Steps SE21–SE25.

[Step SE21]

On receiving event information slightly after the pre-read pointer process, the playback pointer process is activated. In Step SE21, the performance data of the data block section specified by the playback pointer RP is detected. For example, in FIG. 17, the performance data of the data block Dm specified by the playback pointer RP at $t_{n+1}$ is detected, then the process proceeds to Step SE22.

[Step SE22]

In Step SE22, based on the detected performance data (e.g. Dm), the generation process and other necessary audio source processes are begun immediately.

[Step SE23]

In Step SE23, the analyzed results (CG data) provided in advance for the performance data during the pre-read (Step SE12 of the pre-read pointer process) are read from the storage device based on the playback pointer. The process then proceeds to Step SE24.

[Step SE24]

In Step SE24, CG images are drawn based on the read analyzed data (CG data), after which the process proceeds to Step SE25. As a result, the image corresponding to the rendition data (for example, Dm) appears onscreen, in sync with the music, on the display 12.

[Step SE25]

In Step SE25, the playback pointer RP is advanced incrementally by one, after which it reverts to waiting for the next interruption. Sound generation and image generation processes corresponding to the performance data proceed sequentially through this process flow. In the above-mentioned examples, the pre-read and the playback are processed simultaneously in real time. Before playback, the performance data from the MIDI file may be batch-processed, which allows the pre-reading of an entire song. It is possible to perform the playback process over all performance data, once drawing preparations have been completed.

As described above, according to the pre-read analysis process of the present invention, the images are provided in the form of CG data corresponding to the music events in advance. This facilitates smooth drawing (image generation) during music generation, and not only minimizes drawing delays and overloading, but also reduces the drawing process load, and affords image objects with more natural movement. For instance, when displaying a pianist as image objects, the right hand of the pianist is specified as the only movable part during the event, and it is possible to engineer the timing so that when the right hand is about to be drawn as moving in correspondence with the event, the left hand, which is not directly involved in this event, can be raised using the extra power of the computer machine.

[The Interpolation Process]

As described earlier, it is possible to implement interpolated motion processes in movement display steps such as steps SM7, SM9, SS10, SS12 of the performance data process SM and the beat process SS. This enables the movable parts to move in response to the event Iv and the beat Bt, and be displayed in a more natural way, rather than instantaneously. According to the preferred embodiment of the present invention, the interpolation process is activated using key frames set to correspond to the specified sync signals accompanying the music play of beats for the movement display steps. The embodiment even provides a way to realize interpolation control proportional to the processing power of the image generation system.

In other words, according to the interpolation process of the present invention, it is possible to control the interpolated motion of the movable parts to the best of the image generation system's capacity by establishing separate interpolation process routines which activate the interpolation process by using the aforementioned key frames; these are called "Control of Frequencies Of Interpolations over Specified Time" or "Interpolation Control by Time Reference". During the interpolation process of the present invention, flags are applied to the movable parts until they reach the target position, by which can be ascertained the status of the movable parts, as well as the fact that they are undergoing the interpolation process.

[Control of Frequency Of Interpolations over Specified Time=Interpolation Process (1)]

First of all, the interpolation frequency control over a specified time defines the length of time in terms of, for example, beats in units of time. The standard CG drawing timing corresponding to the specified length of time is set as key frames kfi, kfi+1, . . . (i=0, 1,2, . . . ); and the interpolation count within the timeframe of each key frame is controlled.

Figure 19:
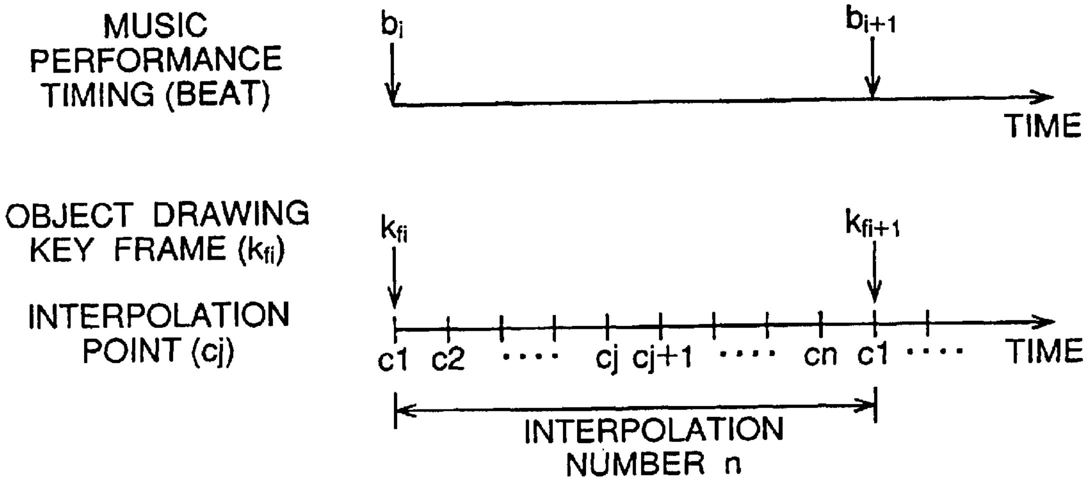
FIG. 19 shows a time chart to explain the "Interpolation Frequency Control by Specified Time Length" of the present invention.

FIG. 19 shows a time chart describing control of the interpolation count in which the length of the specified time is represented in units of beats. In other words, in the example shown in this chart, the drawing key frames kfi, kfi+1, . . . , corresponding to the rendition timings bi, bi+1, . . . specified in beat units are renewed. The interpolated motion occurs n times at the interpolation points cj (j=1,2, . . . ,n) between these successive key frames. Following the characteristics of interpolation frequency control of the present invention, the interpolation count n within the specified length of time (kfi–kfi+2, kfi+1-kfi+2, . . . ) is controlled according to the system's processing power, and allows the execution of suitable interpolations.

Figure 20:
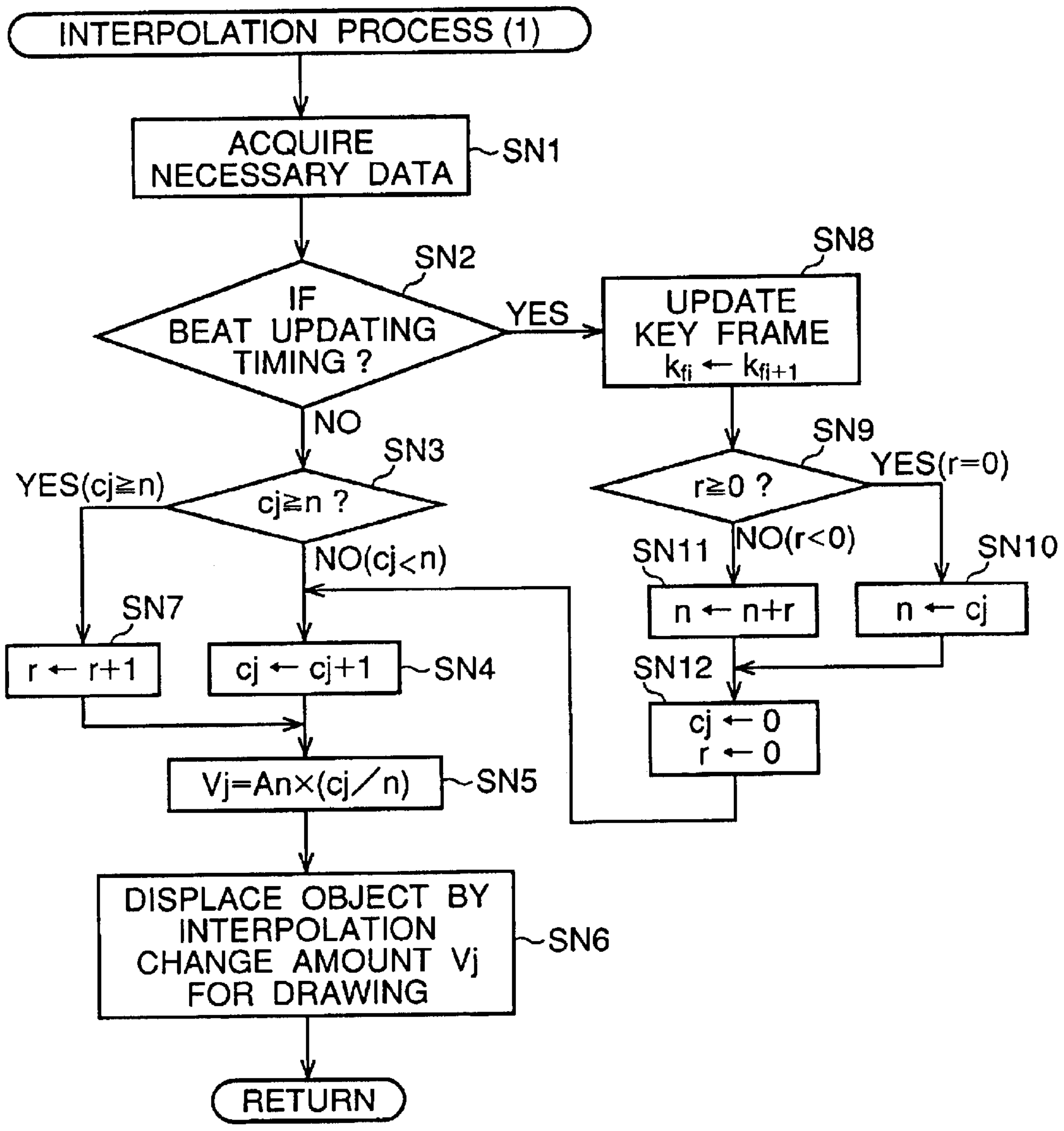
FIG. 20 shows the process flow of the "Interpolation Frequency Control by Specified Time Length" of the present invention.

FIG. 20 shows an example of the process flow of crucial sections in interpolation frequency control as the "Interpolation Process (1)". This "Interpolation Process (1)" is, like FIG. 19, an example in which beats have been specified as the length of time. The step-by-step process is explained as follows.

[Step SN1]

This Interpolation Process (1) is activated by periodic interrupts, at specified intervals, set to correspond to the system's processing power. When the movable parts of the CG image objects, which have been flagged to indicate their interpolation status, are detected, in Step SN1 the necessary data for interpolation control of the detected movable parts is obtained, then the process proceeds to Step SN2.

[Step SN2]

In Step SN2, it is determined whether the beat data in the performance data indicates a beat updating timing. If it is the beat updating timing (YES), the process proceeds to Step SN8, and if not (NO) the process proceeds to Step SN3.

[Step SN3]

In Step SN3, the interpolation point number cj is compared with the interpolation number n, initially perceived as an arbitrary value. If cj is greater than n, the process proceeds to Step SN7; if not (cj is less than n) the process proceeds to Step SN4.

[Step SN4]

In Step SN4, the interpolation point number cj of the movable parts is moved incrementally by 1 and updated to the value "cj+1" ("cj+1"→cj); after which the process proceeds to Step SN5.

[Step SN5]

The amount of movement within the key frame starting from the initial position to the final position of the key frame kfi is obtained by multiplying the product of the velocity value and the movement scale value Vs of the performance data (full amount of movement: Rotation angles or movement lengths) by the specified coefficient Kn, as An=Kn×V×Vs. In Step SN 5, An x (cj/n)="Interpolation Change" Vj is calculated. The interpolation change Vj of the key frame kfi, starting from the initial position to the current (No. J) interpolation position is calculated, after which the process proceeds to Step SN6.

[Step SN6]

In Step SN6, drawing is conducted at a current interpolation position displaced from the initial position over a distance equal to the interpolation change Vj; and after the movable parts have been moved from the previous (No. J−1) interpolation position to this position, control is returned. Should there be other movable parts bearing interpolation flags, it returns to Step SN1, in which the other movable parts undergo the same process; and if there are none, the process reverts to waiting for the next activation. It is also possible to calculate A/n="Unit Interpolation Change" Vu in Step SN5; and to draw the position displaced over a distance equal to the unit interpolation change Vu from the previous (No. J−1) interpolation position in Step SN6.

[Step SN7]

In Step SN7, the change in interpolation count r is incremented by 1 to the value "r+1" ("r+1"→r), after which the process proceeds to Step SN5.

[Step SN8]

In Step SN8, the key frame kfi is updated ("kfi+1"→kfi), after which the process proceeds to Step SN9.

[Step SN9]

In Step SN9, it is determined whether the interpolation count change r is "0". If r=0 (YES), the process proceeds to Step SN10; if not (NO: r>0), the process proceeds to Step SN11.

[Step SN10]

In Step SN10, the interpolation count is updated to the interpolation point number cj ("cj"→n), after which the process proceeds to Step SN12.

[Step SN11]

In Step SN11, the interpolation count n is updated to the value n+r after the interpolation count change r has been added ("n+r"→n), after which the process proceeds to Step SN12.

[Step SN12]

The interpolation point number cj and the interpolation count change r of the movable parts are both initialized to "0", after which the process proceeds to steps SN4–SN6.

As will be explained in full detail later on, the interpolation frequency control of the interpolation process (1) is used to update the interpolation count n in Steps SN10 and SNl1 via the key frame updating step SN8; thus in order for this interpolation frequency control to function effectively regardless of changes in the interrupt intervals, it is necessary to have a plurality of overlapping key frames over the interpolation section (total movement time) from the current position of the movable parts to the target position. Therefore, the coefficient Kn of Step SN5 should ideally be less than 1. However, by incorporating a structure in which the interpolation count n is updated for certain movable parts, and utilized in interpolation processes of other movable parts in the key frames that follow, it is possible to give the coefficient Kn a value of more than 1 (less than one key frame) for specific movable parts.

As the above steps SN1–SN12 make clear, according to this interpolation process (1), the following operation occurs:

[1] Interpolating Operation Between Successive Key Frames kfi–kf+1

From the time it is updated at a certain beat update timing Bi to the corresponding drawing key frame kfi until it reaches the next beat update timing Bi+1, (a) Until the interpolation point number cj, that is to say until the interpolation count reaches the interpolation setting number n, interpolation is executed by the interpolation count equal to this interpolation count cj in Steps SN2 through SN6;

(b) When the interpolation count cj exceeds the set interpolation number n, the interpolation count change r is sequentially incremented ("r+1"→r) via Step SN7; while at the same time interpolation continues for just an extra r number of times with Steps SN5 and SN6.

[2] Setting Operations for the Next Drawing Interval Between Key Frames kfi+1 and kfi+2

When the next beat updated timing Bi+1 is reached, the key frame kfi is updated to the next drawing key frame kfi+1 in Step SN8. As for the interpolation count n, (a) When the updated timing Bi+1 is reached with an actual interpolation count cj, less than the set interpolation number n (r=0), this actual interpolation count cj is designated as the set interpolation number n in Step SN10.

(b) When the updated timing Bi+1 is reached with an actual interpolation count n+r, which is greater than the set interpolation number n (r>0), this actual interpolation count n+r is designated as the set interpolation number n in Step SN11.

Furthermore, while providing interpolated motion during the frame interval kfi+1–kfi+2 until the updating of the next drawing key frame kfi+2, the interpolation point number cj and the interpolation count change r are both initialized to "0" in Step SN12.

In other words, (a) During the frame interval kfi–kfi+1, when the actual number of interpolation processes is less than the frame interval n (r=0), there is no extra power for the interpolation. The interpolation point number cj, that is to say the actual interpolation count cj, attained in this frame, is put in order as the set interpolation number of the next frame interval kfi+1–kfi+2. In this way, the interpolation count is converged as a value corresponding to the system's processing power.

(b) During the frame interval kfi–kfi+1, when the actual number of interpolation processes is greater than the preset count n (r>0), interpolation is executed for only the setting number n, after which there is enough extra power to interpolate an additional r times. Furthermore, the interpolation executed until the next frame kfi+2 updates, including this extra interpolation r, is designated as the set interpolation number, and it is designed to allow even more minute interpolation. In this case too, the interpolation count is resolved to a value corresponding to the system's processing power, and minute interpolation is executed with this interpolation count.

Therefore, according to the interpolation process (1) of the present invention, it is possible to execute interpolation as minute as the system's processing power will allow. For a given system, for the increase/decrease in processing load, it is possible to realize real time increases or decreases of the interpolation count from the subsequent image key frames. In addition, this interpolation process (1) is a particularly ideal method for obtaining CG animation images synchronized with the beat.

[Interpolation Control by Time Reference=Interpolation Process (2)]

Next, the "Interpolation Control by Time reference" sets the standard timing corresponding to a time length D predetermined in time units such as, for example, beats, bars, number of ticks and the like at key frames kfi, kfi+1, . . . (i=0,1,2, . . . ) during playing of the music. Further, the "Interpolation Control by Time reference" holds the key frame starting time data Tkf and the interpolation time length D within the key frame kfi data. The elapsed time tm from the start of the music play is compared with this starting time Tkf for each rendering, and the interpolated motion is executed in order during this time length D. When the music reaches the next key frame, interpolation begins within the next time length D.

Figure 21:
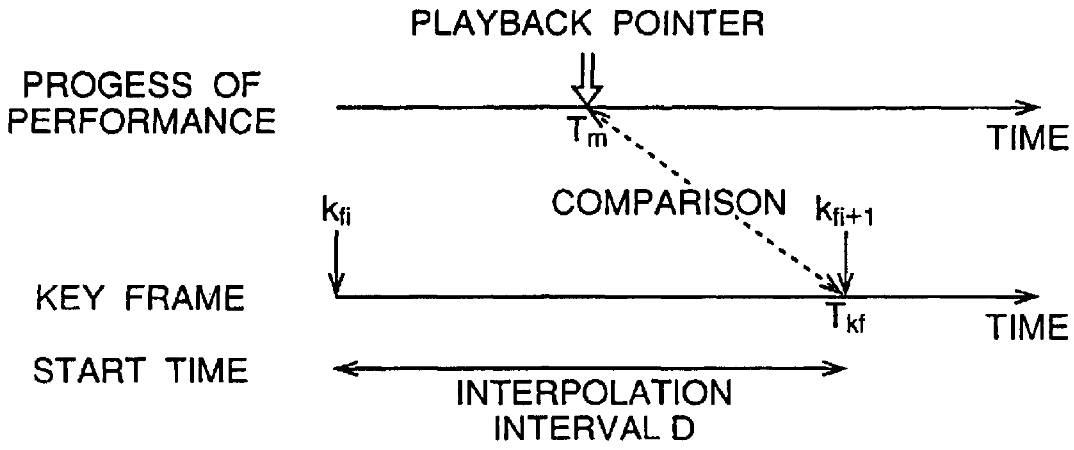
FIG. 21 shows a time chart to explain the "Interpolation Control by Time Referring" of the present invention.
Figure 22:
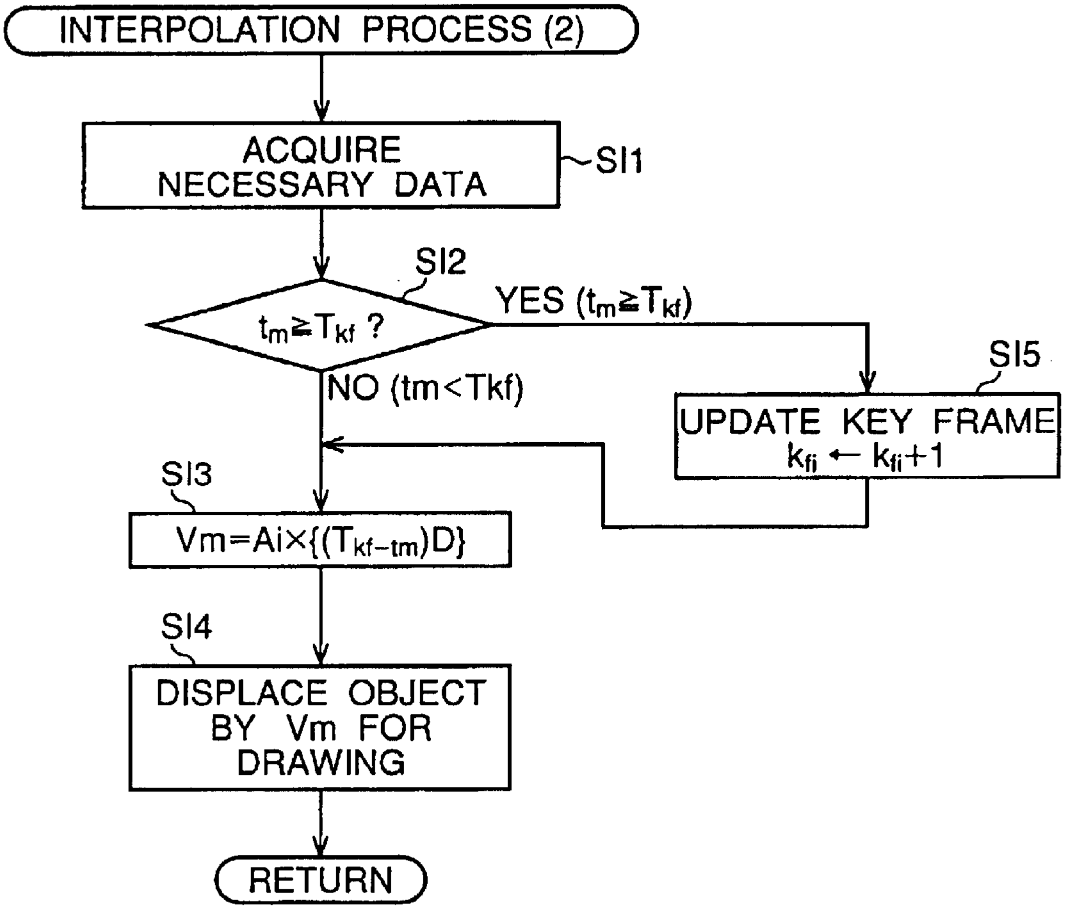
FIG. 22 shows the process flow of the "Interpolation Control by Time Referring" of the present invention.

FIG. 21 shows a time chart for explaining such time comparison-based interpolation control. In addition, FIG. 22 shows an example of the process flow of this interpolation control as "Interpolation Process (2)". The step-by-step process of this process flow SI is described below.

[Step SI1]

The interpolation process (2) is activated by a series of interrupts at specified intervals set according to the system's processing power. For the movable parts of CG image objects bearing flags signifying that interpolation is in process, the performance data and control data necessary for the interpolation is first obtained in Step S11, after which the process proceeds to Step SI2.

[Step SI2]

In Step SI2, the elapsed time tm from the start of the music play is obtained from the performance data specified by the playback pointer. This elapsed time tm is compared with the start time Tkf of the next key frame kfi+1. When the elapsed time tm reaches the key frame start time kfi+1 (YES: $tm \geqq Tkf$), the process proceeds to Step S15. If not (NO: $tm<Tkf$) the process proceeds to Step SI3.

[Step SI3]

The key frame movement amount of the key frame kfi, from starting position to final position, obtained by further multiplying the arbitrary coefficient Ki by the product of the velocity value V of the performance data and the movement scale value Vs (total movement: Rotation angle or movement distance) is designated as $Ai=Ki\times V\times Vs$. Regarding the movable parts, $Ai\times\{(Tkf-tm)/D\}$="Interpolation Change" Vm is calculated; the interpolation change Vm of the distance from the starting position to the current interpolation position is calculated, and the process proceeds to step SI4. It is preferable that the coefficient Ki is set at less than 1, so that the total interpolation term from the starting position covers one key frame interval.

[Step S14]

In Step SI4, rendering is executed at the current interpolation position displaced from the starting position a distance equal to the interpolation change Vm; after the movable parts have been moved from the previous interpolation position to this position, control is returned. If the following movable parts bear flags, the system returns to Step SI1 and subjects the next movable parts to the same process; if there are none, the system returns to awaiting subsequent activation.

[Step SI5]

In Step SI5, the key frame kfi is updated ("kfi+1"→kfi), the starting time Tkf is updated ("Tkf+D"→Tkf), and the starting time of the next key frame kfi+1 is calculated, after which the process proceeds to Steps SI3 and SI4.

As the aforementioned Steps SI1–SI5 make clear, according to this interpolation process (2), following the time tm corresponding to the number of periodic interrupts allowed by the system's processing power, the interpolation position within the key frame interval can be calculated. In addition, this interpolation process (2) is an ideal process for obtaining CG animation images synchronized with and responsive to event performance data. In this way, the interpolation process of the present invention guarantees smooth image movement and also realizes an image generation method from which animation synchronized with music can be obtained.

[Movement Control Position Determination by Analysis of Performance Data]

As shown in the areas DA and CA of FIG. 8, music data such as MIDI data contains a wide variety of performance data such as events (Note On/Off, various control data and the like), time, tempos, program changes (timbre selection), and the like. This performance data can be used not only for controlling individual movements of the movable parts of the image objects, but also for the control of the total image. For example, it is possible to analyze the performance data as imparting unique data related to the finger movements and performance conditions of the models, and as imparting particular image control command data; through the use of these, it is possible to generate higher quality and more diverse motion images.

Figure 23:
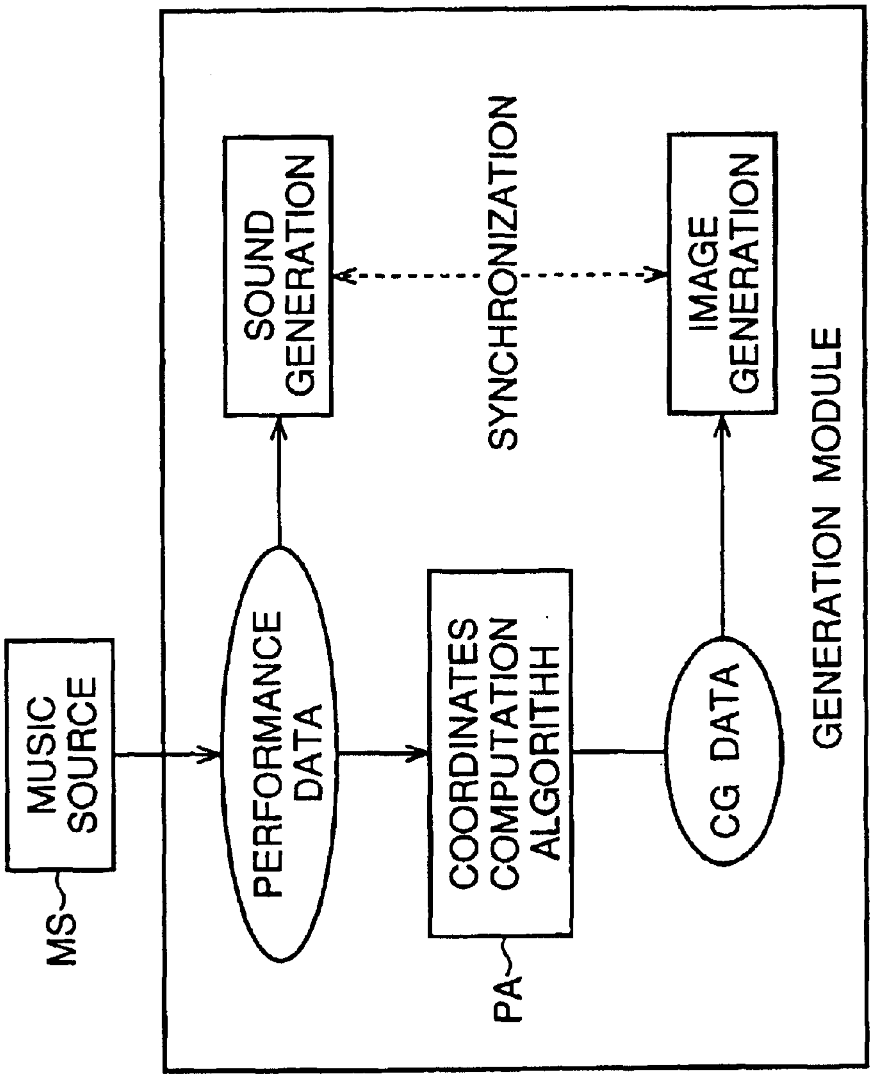
FIG. 23 is a conceptual view explaining the "Position Determination Control by Performance data Analysis" of the present invention.

The present invention allows the generation of coordinate data after the movement of the image object (CG model), using a coordinate generation algorithm analyzing a compilation of the performance data. Based on this coordinate data, a method for controlling the movements of the image object is provided. This method is shown in the conceptual view of FIG. 23. The coordinate generation algorithm PA, comprising a part of the music and image generation module, calculates from the performance data fed from the music data source MS (e.g., events such as Note On/Off) the amounts necessary for the movement control of the coordinate values or angle values of each section of the CG models. The coordinate generation algorithm PA then converts the values obtained from this calculation into CG data represented by key frame coordinate values and the like. Next the coordinate generation algorithm PA synchronizes with the generation of music based on the performance data, and produces natural CG model rendition movements based on this CG data.

One example of this is, as mentioned above, the fact that it is possible to generate more natural images by controlling the movements of the specified movable parts of the image objects by using the results from the analysis of a plurality of performance data. For example, by pausing a plurality of events at a certain time frame, and then estimating the rendition form at that point in time from the gathering of "Note On" data or note numbers, it is possible to determine the natural position of the movable parts of an instrument player. In an example where a pianist playing the piano is the image object to be generated, the harmonies are analyzed from the distribution of the performance data. It is possible to realize natural-looking movements for the pianist by controlling the determination of the position of the pianist's wrists based on these analyzed results. Namely, according to the invention, the setting means sets the motion parameters to design a movement of the object representing a player of an instrument, and the video means utilizes the motion parameters to form the framework of the motion image of the player and utilizes the performance data to modify the framework for generating the motion image presenting the player playing the instrument to perform the music.

In order to realize such natural movements, the present invention estimates the rendition form of the instrument player model by analyzing the summarized performance data, using the coordinate generation algorithm. Following this estimation, the coordinate value of the target position is calculated as CG data. This CG data controls the rendition of the movements of the player model.

In order to produce such rendition movements with accuracy and realism, it is necessary to analyze a plurality of performance data by using various operation methods, or if necessary to take into account the sequence of the performance data when making inferences. In such cases, as will be described later, in order to achieve reliable synchronization with the music generation, analysis or inference is done in advance, and the movement control data of the player models is created. In preferred practice, these rendition movements are reproduced using this movement control data. In the inventive system, the video module I generates the motion image of an object representing an instrument player, the video module I sequentially analyzing the music control information to determine a rendition movement of the instrument player for controlling the motion image as if the instrument player plays the music.

[Movement Control and Position Determination by Analysis of Performance Data]

[Wrist Position Determination Process]

Figure 24:
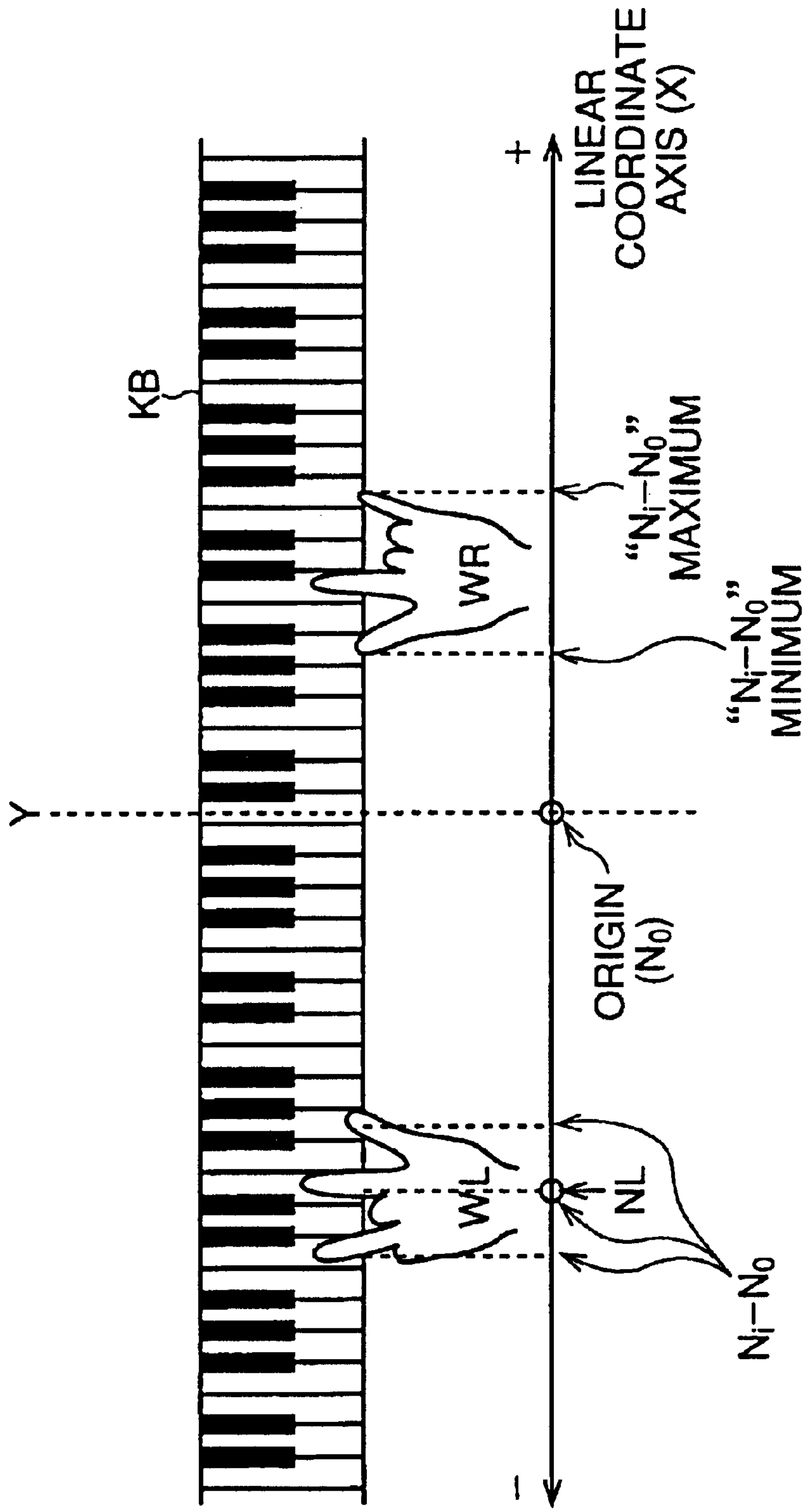
FIG. 24 shows a time chart explaining the "Wrist Position Determination Process" of the present invention.

Following is a very simple description of a movement control method which can realize, even in real time, movement control position determination for the CG model, and can infer the rendition form by analyzing the performance data. This method is named, for convenience, the "Wrist Position Determination Process" and shows an example of determining the position of the wrist of the image object, which is a keyboardist model similar to the above-mentioned pianist. In this "Wrist Position Determination Process", the Note On data having the same timing is used as batch performance data. The keyboardist model's wrist position is calculated from this data. FIG. 24 shows an explanatory conceptual view of the aforementioned wrist position determination process (SW). When looking at the music keyboard KB disposed along the X axis of the plane XY viewed from the Z axis, the spatial relationship of the player model's left wrist WL, to be processed as CG drawing, to the keyboard KB is shown.

Figure 25:
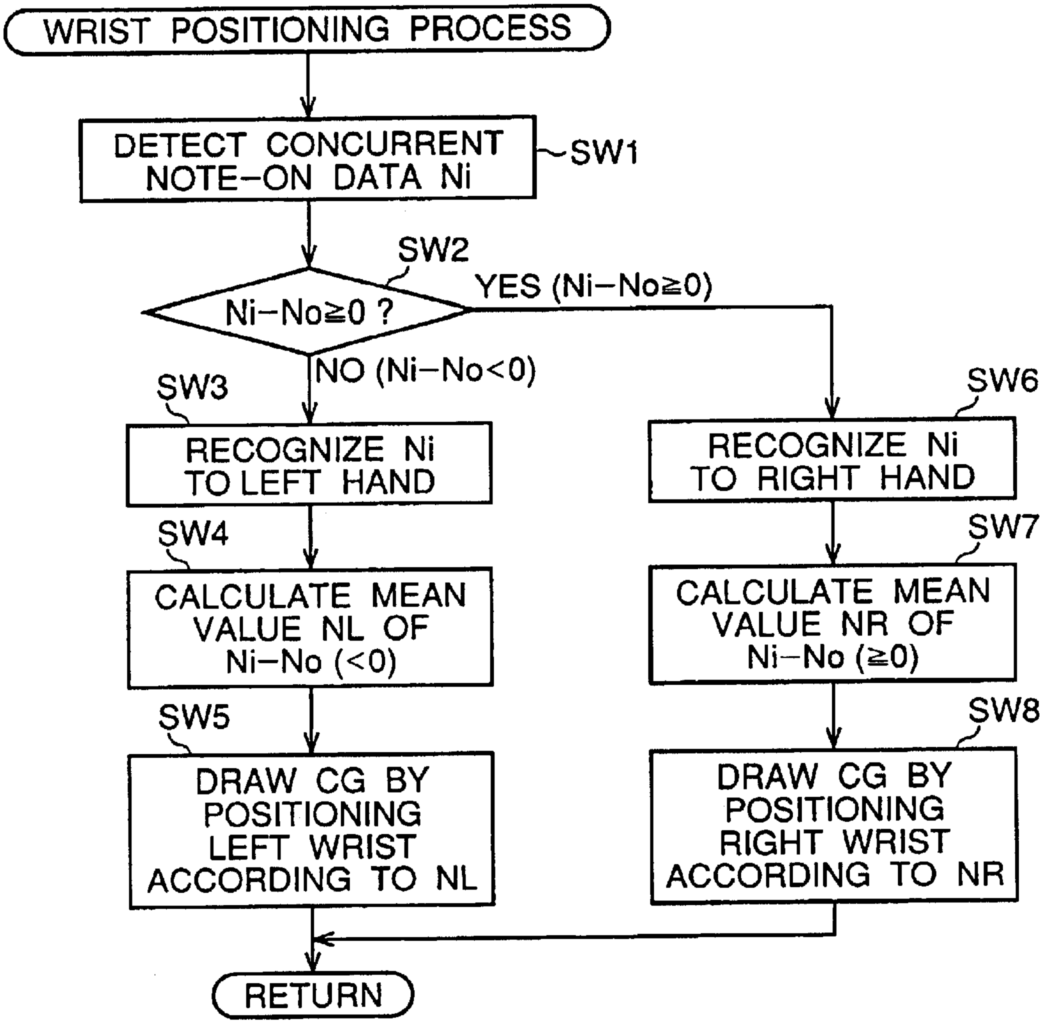
FIG. 25 shows the process flow of the "Wrist Position Determination Process" of the present invention.

Also FIG. 25 shows the coordinate calculation algorithm of the wrist position determination process (SW) outlined in a flowchart. The process flow SW shown here receives performance data of the movable parts related to the wrist, and can be activated by the arrival of a plurality of Note On data Ni (represented by Note Number Ni), having approximately the same timing as the performance data. Following is the step-by-step process of this process flow SW.

[Step SW1]

In Step SW1, all Note On data Ni having the same timing are detected, after which the process proceeds to Step SW2.

[Step SW2]

In Step SW2, the values "Ni−No" of all the Note On data Ni detected in Step SW1 to have the same timing is compared with "0". The value No here refers to a specific note selected as the standard position, and majority logic is used to decide on the outcome of its comparison with multiple values "Ni". If this comparison results is $Ni-No \geqq 0$ (YES), the process proceeds to Step SW6; if not (NO: $Ni-No<0$) the process proceeds to Step SW3.

[Step SW3]

If the process proceeds to Step SW3, the Note On data Ni which has been detected to have the same timing is recognized as accompanying the rendition form being played by the pianist's left hand, and the process proceeds to Step SW4.

[Step SW4]

In Step SW4, the average value NL for the value "Ni–No" (<0) of the Note On data Ni which have been detected to have the same timing is calculated, after which the process proceeds to Step SW5.

[Step SW5]

In Step SW5, the average value NL of the Note On data Ni which have been detected to have the same timing is shown as the position of the left wrist WL on the coordinate line having the note number No position as its origin point. After executing CG drawing of the left wrist WL at this position, control is returned; and the system waits for the arrival of the next Note On data.

[Step SW6]

If the process proceeds to Step SW6, the Note On data Ni which have been detected to have the same timing are recognized as what is being played by the pianist's right hand, and the process proceeds to Step SW7.

[Step SW7]

In Step SW7, the average value NR of the value "Ni–No" (≧0) of the Note On data Ni is calculated, after which the process proceeds to Step SW8.

[Step SW8]

In Step SW8, the average value NR of the Note On data Ni which have been detected to have the same timing is shown as the position of the right wrist WR on the coordinate line having the note number No position as its starting point. After executing the CG drawing of the right wrist WR at this position, the return button is hit and the system waits for the arrival of the next Note On data.

As a result of these processes, for example, if after going through Steps SW1–SW5 the system proceeds to Step SW6, the right wrist WR is drawn as a CG at the position of the average value NR (<0) along the coordinate line having the note number No position as its starting point, as shown in FIG. 24.

In this way, once the positions NL and NR of the left and right wrists WL and WR are determined, the positions of the elbow, arms, and shoulders can be determined automatically, after which it becomes possible to determine the approximate framework of the player model.

The average values NL and NR of the Note On data Ni having the same timing are calculated in the aforementioned example of the wrist position determination process, which merely determines the wrist position using these average values. However, in addition to this, a range of inferences and operations are made, based on which the movements of each section of the player models are controlled, which afford the player models more naturalness in their movements.

For example, as shown on the right side of FIG. 24, in the case of the right wrist WR, it is inferred that the largest of the values "Ni–No" among the Note On data having the same timing is the model's little finger, and that the smallest of these figures is the model's thumb. Furthermore, in this case, since the fingers are of differing lengths, weighting according to the difference in length of the two digits in the wrist position may be conducted.

The above-mentioned example also shows a single-tiered keyboard instrument to be played, as the keyboard KB of FIG. 24 disposed along a single linear coordinate (X). Should the instrument be an organ, it is possible to provide two tiers, one over the other, as the linear coordinates. In this case, there is provided an organ rendition algorithm for determining each wrist position in relation to each level of the coordinates which corresponds to the performance data, wherein the upper level is assigned to the right hand, while the lower level is assigned to the left hand. This allows each of the movements of the player models to be controlled in the same manner as the single-tiered keyboard instrument.

[Position Determination Control by Performance Data Analysis with Joint Use of Pre-Reads]

Like the wrist position determination process, position determination by inferring the rendition form through analysis of the performance data can be realized accurately and in good synchronization with the music being played, as mentioned above, by creating movement control data in advance. In other words, the natural positions of the movable parts of the image objects such as the instrument player models are predicted by analysis and by applying various operations and inferences to the performance data group obtained in advance from the pre-read. The predicted results of this analysis are used to control the movements of the image objects during the performance of the music and the image generation corresponding to this performance data group. Under this method, when creating wrist position data and the like in advance, it is also possible to create the position data of the remaining movable parts (elbows, arms, shoulders and the like) without lagging behind the music. Therefore, it is possible to generate higher-quality images in good synchronization with the music play during the music reproduction and image generation.

Following is a description of the use of this type of pre-read analysis shown in the "Wrist Position Determination Process" of FIG. 25. In this case, most of the process flow SW of FIG. 25 corresponds to the pre-read pointer process step SE12 of FIG. 18A, and only the drawing processes of Steps SW5 and SW8 correspond to the playback pointer process steps SE23 and SE24.

In other words, in Step SE1 of the pre-read pointer process of FIG. 18, performance data specified by the pre-read pointer PP is detected in sequence, after which the process proceeds to Step SW1. In this Step SW1, all Note On data Ni having approximately the same timing is detected from this performance data. After going through Step SW2, the system then proceeds to Steps SW3, SW4 or Step SW6, SW7 and SW5 or Step SW8.

In Steps SW5 and SW8, the average values NL and NR of "Ni–No" calculated from the group of Note On Data Ni having the same timing are stored, along with the pointer, in the memory device as CG data representing the positions of the wrists WL and WR along the linear coordinate having the note number No position as its origin point. At this point, the pre-read based advance performance data process is completed.

Next, the drawing process of Steps SW5 and SW8 is made to correspond to the playback pointer process steps SE23 and SE24 during the music reproduction and the image generation. In other words, in Step SE23, the CG data for wrist position determination corresponding to the playback pointer RP command is read from the memory device as CG data for the wrists WL and WR. Based on this CG data, in Step SE24, the note origin point No as the reference points of average values NL and NR are specified as the wrist positions WL and WR, and CG drawing is executed.

[CG Model Display Switching]

Furthermore, the music data includes various usable performance data such as program changes, in addition to the performance data already used in the aforementioned examples. Controlling images using this type of data allows the generation of more diverse-motion images. For example, as shown in FIG. 6, performance data such as program changes can be used as display switching image control data for the CG model IM. In this case, CG models $IM_1$, $IM_2$ playing specific instruments must be provided as the CG model IM and position determination algorithm PA, as well as a plurality of combinations of coordinate generation (position determination) algorithms $PA_1$, $PA_2$, . . . for individual instruments each corresponding to these models. The corresponding CG models and the position determination algorithms should be made to change by the program change data used in the timbre selection. Namely, in the inventive system, the sequencer module S provides the music control information containing a message specifying an instrument used to play the music, and the video module I generates the motion image of an object representing a player with the specified instrument to play the music.

Figure 26:
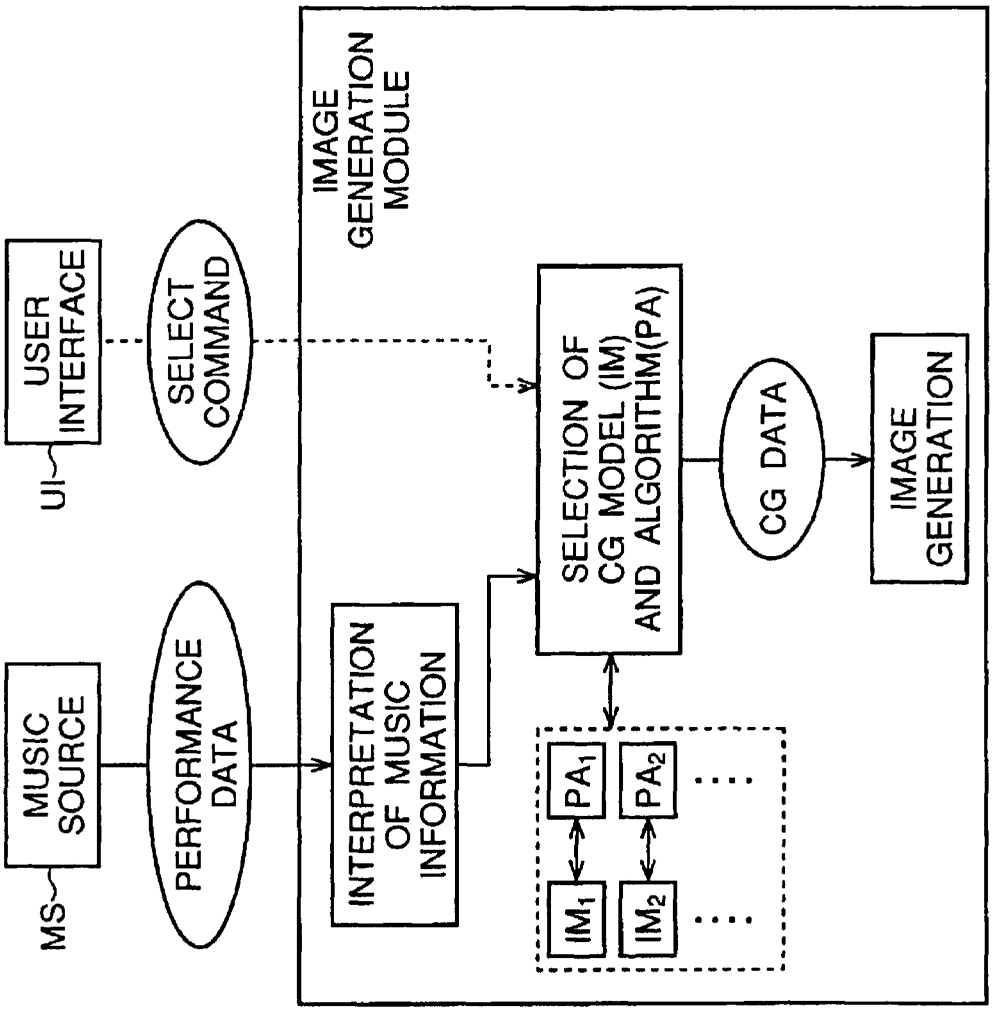
FIG. 26 is a conceptual view explaining the display switching of the CG models of the present invention.

In other words, as shown in FIG. 26, specific performance data from the music data source MS determines what instrument data to provide. Based on this instrument type decision, the corresponding CG models and algorithms are selected from the plurality of CG model/algorithm combinations, prepared in advance, $IM_1$-$PA_1$, $IM_2$-$PA_2$, . . . . For example, when the timbre designation data or the program change is used as specific performance data, the timbre change command is received from the timbre designation data contained within the performance data, and the CG model IM to be drawn is changed to the specified instrument image and player model. At the same time, the coordinate generation algorithm PA to be activated is also changed, and it is then possible to execute the CG drawing process of the player model based on the corresponding algorithm.

For example, the piano rendition algorithm and the aforementioned organ rendition algorithm such as those shown in FIGS. 24 and 25 will be explained. The piano rendition algorithm and the organ rendition algorithm are programmed to respond to, respectively, the piano timbre data and organ timbre data contained within the performance data. If the timbre data in the performance data is that of a piano, a player model playing a piano-type single-tiered keyboard instrument based on the piano rendition algorithm is drawn. If the timbre data becomes that of an organ, via a timbre change command, the image to be drawn is changed to that of a two-tiered keyboard instrument, and the algorithm is changed to that of an organ rendition algorithm. A player model playing this organ can then be drawn.

As the broken line of FIG. 26 shows, it is acceptable to provide an instrument or an algorithm selection button on the user interface UI. Through the arbitrary operation of this selection button, the CG model IM and the algorithm PA are selected by the selection signals, making it possible to also change the display to an arbitrary instrument rendition image.

As described above, according to the present invention, the movement parameters for controlling the movements of each of sections of the image objects corresponding to the music which appear onscreen are set in advance. During the music play, images having each segment controlled by the set movement parameters are generated, based on the corresponding music control data and the synchronization signal. Therefore, the generated images can not only change to match the mood of the music, but can also change as one with the music as it is being played. The present invention is equipped with a parameter settings mode allowing the user to arbitrarily change the movement parameters of each of the image object's movable parts. This does not merely provide display of motion images seamlessly integrated with music, but also an interactive man-machine interface allowing the user to freely set the movements of image objects, such as dancers, based on performance data. According to the present invention, through the pre-read analysis process, the performance data is analyzed in advance, and the CG data is prepared also in advance. By using the prepared CG data, rendering which occurs during music event generation (playback) can be activated in good synchronization with the music generation, which eliminates lags in drawing and the occurrence of overloading. In addition, the load to the drawing process during playback is reduced. For example, in the case of the pianist CG, there is ample time for CG generation, such as raising the hand not directly involved in the event. According to the interpolation process of the present invention, interpolation control corresponding to the processing power of the image generation system is executed by using key frames corresponding to the synchronization signals. This not only guarantees smooth image motion, but also guarantees that animation in sync with the music is obtained. Furthermore, according to the present invention, it is possible to create realistically-moving animation with the player models in a natural-looking rendition form by analyzing groups of music data and predicting the rendition form. Also, by preparing a plurality of selectable algorithms corresponding to a range of images, it is possible to easily switch between various animations. Also, because the present invention uses synchronization signals and performance data of the music data to be played simultaneously as music for all CG motion image generation, the movements of the images fit and are unique to each song played. In addition, they differ from song to song, and it is also possible to easily create animation in sync with the music. It is also possible to store the movement parameters set to correspond to the music in parameter settings mode in storage media such as a floppy disk. During music play, these movement parameters can be read from the memory device according to the music being played.

What is claimed is:

1. A system for animating movable parts of an object along with music, said system comprising:

a sequencer module that sequentially provides music control information in correspondence with the music to be played, the music control information including a plurality of types of music control event data for controlling a sound of the music to be played;

a parameter setting module for generating a graphical user interface that is operable to select a type of music control event data from among the plurality of types of the music control event data that are graphically displayed for selection, said graphical user interface operable to assign a type of music control event data to each of the movable parts of the object such that each of the movable parts correspond to an assigned type of music control event data, wherein the correspondence between each of the movable parts and the corresponding assigned type of music control event data is displayed;

an audio module for generating the sound in accordance with each music control event data included in the music control information to thereby play the music; and a video module responsive to the music control information for controlling movements of the respective movable parts in correspondence to the types of music control event data included in the music control information sequentially provided from the sequencer module, thereby generating a motion image of the object in matching with progression of the music.

2. The system as claimed in claim 1, wherein the video module analyzes a data block of the music control information for preparing a frame of the motion image in advance to generation of the sound corresponding to the same data block by the audio module, so that the video module can generate the prepared frame timely when the audio module generates the sound according to the same data block used for preparation of the frame.

3. The system as claimed in claim 1, wherein the video module successively generates key frames of the motion image in response to the music control information, the video module further generating a number of sub frames inserted between the successive key frames by interpolation to smoothen the motion image while varying the number of the sub frames dependently on a resource of the system affordable to the interpolation.

4. The system as claimed in claim 1, wherein the video module generates the motion image of an object representing an instrument player, the video module sequentially analyzing the music control information to determine a rendition movement of the instrument player for controlling the motion image as if the instrument player plays the music.

5. The system as claimed in claim 1, wherein the parameter setting module sets motion parameters effective to determine the movements of the movable parts of the object, and the video module generates the motion image according to the motion parameters, the video module periodically resetting the motion image to revert the movable parts to the default positions in matching with the progression of the music.

6. The system as claimed in claim 1, wherein the video module is responsive to the synchronization signal, which is provided from the sequencer module and which is utilized to regulate a beat of the music so that the motion image of the object is controlled in synchronization with the beat of the music.

7. The system as claimed in claim 1, wherein the sequencer module provides the music control information containing the musical control event data specifying an instrument used to play the music, and wherein the video module generate the motion image of an object representing a player with the specified instrument to play the music.

8. The system as claimed in claim 1, wherein the parameter setting module sets motion parameters effective to determine the movements of the movable parts of the object, and the video module utilizes the motion parameters to control the motion image of the object such that the movement of each part of the object is determined by the motion parameter, and utilizes the music control information controlling an amplitude of the sound to further control the motion image such that the movement of each movable part determined by the motion parameter is scaled in association with the amplitude of the sound.

9. The system as claimed in claim 1, wherein the parameter setting module sets motion parameters effective to determine a posture of a dancer object, and wherein the video module is responsive to the synchronization signal provided from the sequencer module for generating the motion image of the dancer object according to the motion parameters such that the dancer object is controlled as if dancing in matching with progression of the music.

10. An apparatus for animating movable parts of an object along with music, said apparatus comprising:

sequencer means for sequentially providing performance data of the music, the performance data including a plurality of types of music control event data for controlling a sound of the music to be played;

setting means for generating a graphical user interface that is operable for selecting a type of music control event data from among the plurality of types of the music control event data that are graphically displayed for selection, said graphical user interface operable for assigning a type of music control event data to each of the movable parts of the object such that each of the movable parts correspond to assigned type of music control event data, wherein the correspondence between each of the movable parts and the corresponding assigned type of music control event data is displayed;

audio means for generating the sound in accordance with each music control event data included in the performance data to thereby perform the music; and video means responsive to the performance data for controlling movements of the respective movable parts in correspondence to the types of music control event data included in the performance data sequentially provided from the sequencer means, thereby generating a motion image of the object in matching with the progression of the music.

11. The apparatus as claimed in claim 10, wherein the video means includes means for analyzing a block of the performance data to prepare a frame of the motion image in advance to generation of the sound corresponding to the same block by the audio means, so that the video means can generate the prepared frame timely when the audio means generates the sound according to the same block used for preparation of the frame.

12. The apparatus as claimed in claim 10, wherein the video means comprises means for successively generating key frames of the motion image in response to the performance data, and means for generating a number of sub frames inserted between the successive key frames by interpolation to smoothen the motion image while varying the number of the sub frames dependently on a resource of the apparatus affordable to the interpolation.

13. The apparatus as claimed in claim 10, wherein the setting means comprises means for setting the motion parameters to design a movement of the object representing a player of an instrument, and wherein the video means comprises means for utilizing the motion parameters to form the framework of the motion image of the player and means for utilizing the performance data to modify the framework for generating the motion image presenting the player playing the instrument to perform the music.

14. A method of animating movable parts of an object in association with music, said method comprising the step of:

sequentially providing performance data to perform the music, the performance data including a plurality of types of music control event data associated to the music to be played;

displaying a graphical user interface operable for selecting and setting a type of music control event data from amongst the plurality types of music control event data that are graphically displayed for selection, said graphical user interface operable for assigning a type of music control event data to each of the movable parts of the object such that the respective movable parts correspond to the assigned music control event data, wherein the correspondence between each of the movable parts and the corresponding assigned type of music control event data is displayed;

generating a sound in accordance with the performance data to thereby perform the music; and generating a motion image of the object in matching with the progression of the music, wherein the step of generating a motion image is in response to the performance data for controlling movements of the respective movable parts in correspondence to the types of music control event data included in the performance data sequentially provided by said step of sequentially providing performance data.

15. The method as claimed in claim 14, wherein the step of generating a motion picture includes analyzing a block of the performance data to prepare a frame of the motion image in advance to generation of the sound corresponding to the same block so that the prepared frame can be generated timely when the sound is generating according to the same block used for preparation of the frame.

16. The method as claimed in claim 14, wherein the step of generating a motion image comprises successively generating key frames of the motion image in response to the performance data, and generating a variable number of sub frames inserted between the successive key frames by interpolation to smoothen the motion image.

17. The method as claimed in claim 14, wherein the step of displaying a graphical user interface further comprises providing motion parameters to design a movement of the object representing a player of an instrument, and wherein the step of generating a motion image further comprises utilizing the motion parameters to form the framework of the motion image of the player and utilizing the performance data to modify the framework for generating the motion image presenting the player playing the instrument to perform the music.

18. A machine readable medium for use in a computer having a CPU and a display, said medium containing program instructions executable by the CPU for causing the computer system to perform a method for animating movable parts of an object along with music, said method comprising the steps of:

sequentially providing music control information in correspondence with the music to be played, the music control information including a plurality of types of music control event data for controlling a sound of the music to be played;

displaying a parameter setting graphical user interface, said parameter setting graphical user interface operable for selecting a type of music control event data from among the plurality of types of music control event data that are graphically displayed for selection and designating a type of music control event data to each of the movable parts of the object, wherein the correspondence between each of the movable parts and the corresponding designated type of music control data is displayed;

receiving a selection from said parameter setting graphical user interface of a type of music control event data from among the plurality of types of music control event data and designation of the type of music control event data to each of the movable parts of the object such that the respective movable parts correspond to the types of music control event data;

generating a sound in accordance with each music control event data included in the music control information to thereby play the music; and in response to the music control information for controlling movements of the respective movable parts in correspondence to the types of music control event data included in the music control information, generating a motion image of the object in matching with progression of the music.

19. The machine readable medium as claimed in claim 18, wherein the motion image is generated by analyzing a data block of the music control information for preparing a frame of the motion image in advance to generation of the sound corresponding to the same data block, so that the we prepared frame is generated timely when the sound is generated according to the same data block used for preparation of the frame.

20. The machine readable medium as claimed in claim 18, wherein the method further comprises the steps of generating successively key frames of the motion image in response to the music control information, and generating a number of sub frames inserted between the successive key frames by interpolation to smoothen the motion image while varying the number of the sub frames dependently on a resource of the computer system affordable to the video module.

21. The machine readable medium as claimed in claim 18, wherein the method further comprises the steps of generating a motion image of an object representing an instrument player, and analyzing the music control information to determine a rendition movement of the instrument player for controlling the motion image as if the instrument player plays the music.

22. A system for animating movable parts of an object along with music, said system comprising:

a sequencer module that sequentially provides music control information in correspondence with the music to be played such that the music control information is arranged into a plurality of channels;

a parameter setting module manually operable to select a channel of music control information from among the plurality of the channels and operable to set the selected channel of the music control information to each of the movable parts of the object such that the respective movable parts correspond to the channels of the selected and set music control information;

an audio module for generating a sound in accordance with the respective channels of the music control information to thereby play the music; and a video module responsive to the music control information for controlling movements of the respective movable parts in correspondence to the channels of the music control information sequentially provided from the sequencer module, thereby generating a motion image of the object in matching with progression of the music.

* * * * *